(12) United States Patent
Zhang et al.

(10) Patent No.: US 10,885,441 B2
(45) Date of Patent: Jan. 5, 2021

(54) SELECTING ATTRIBUTES BY PROGRESSIVE SAMPLING TO GENERATE DIGITAL PREDICTIVE MODELS

(71) Applicant: Adobe Inc., San Jose, CA (US)

(72) Inventors: Wei Zhang, Great Falls, VA (US); Scott Tomko, Lansdowne, VA (US)

(73) Assignee: ADOBE INC., San Jose, CA (US)

( * ) Notice: Subject to any disclaimer, the term of this patent is extended or adjusted under 35 U.S.C. 154(b) by 955 days.

(21) Appl. No.: 15/388,922

(22) Filed: Dec. 22, 2016

(65) Prior Publication Data

US 2018/0181869 A1 Jun. 28, 2018

(51) Int. Cl.
*G06N 5/02* (2006.01)
*G06N 20/00* (2019.01)
*G06N 5/00* (2006.01)

(52) U.S. Cl.
CPC ............. *G06N 5/022* (2013.01); *G06N 20/00* (2019.01); *G06N 5/003* (2013.01)

(58) Field of Classification Search
CPC ..................................................... G06N 5/022
See application file for complete search history.

(56) References Cited

U.S. PATENT DOCUMENTS

| 6,963,870 B2* | 11/2005 | Heckerman | ............ G06Q 10/00 |
| 2016/0196389 A1* | 7/2016 | Moturu | .................. G16H 50/20 705/2 |
| 2016/0292593 A1* | 10/2016 | Agarwalla | ............... G09B 7/06 |
| 2017/0255952 A1 | 9/2017 | Zhang et al. | |

OTHER PUBLICATIONS

Willie et al. "An evaluation of progressive sampling for imbalanced data sets", IEEE, sixth IEEE international conference on data mining-workshops, 2006 (Year: 2006).*
Anil et al. "feature selection: evaluation, application, and small sample performance", IEEE, vol. 19 No. 2, pp. 153-158, Feb. 1997 (Year: 1997).*
Lei et al. "feature selection for high-dimensional data: a fast correlation-based filter solution" dept of computer science and engineering, Arizona State University, pp. 1-8, 2003 (Year: 2003).*

* cited by examiner

*Primary Examiner* — Kakali Chaki
*Assistant Examiner* — Vasyl Dykyy
(74) *Attorney, Agent, or Firm* — Keller Jolley Preece

(57) ABSTRACT

The present disclosure includes methods and systems for generating digital predictive models by progressively sampling a repository of data samples. In particular, one or more embodiments of the disclosed systems and methods identify initial attributes for predicting a target attribute and utilize the initial attributes to identify a coarse sample set. Moreover, the disclosed systems and methods can utilize the coarse sample set to identify focused attributes pertinent to predicting the target attribute. Utilizing the focused attributes, the disclosed systems and methods can identify refined data samples and utilize the refined data samples to identify final attributes and generate a digital predictive model.

20 Claims, 12 Drawing Sheets

Fig. 2A

Repository Of Data Samples 200

| | Attribute 204a | Attribute 204b | Attribute 204c | Attribute 204d | Attribute 204e | Attribute 204f | | Attribute 204x |
|---|---|---|---|---|---|---|---|---|
| Sample 202a | 206aa | 206ab | 206ac | 206ad | 206ae | 206af | | |
| Sample 202b | 206ba | 206bb | 206bc | 206bd | 206be | 206bf | | |
| Sample 202c | 206ca | 206cb | 206cc | 206cd | 206ce | 206cf | | |
| Sample 202d | 206da | 206db | 206dc | 206dd | 206de | 206df | | |
| Sample 202e | 206ea | 206eb | 206ec | 206ed | 206ee | 206ef | | |
| Sample 202f | 206fa | 206fb | 206fc | 206fd | 206fe | 206ff | | |
| Sample 202g | 206ga | 206gb | 206gc | 206gd | 206ge | 206gf | | |
| Sample 202h | 206ha | 206hb | 206hc | 206hd | 206he | 206hf | | |
| Sample 202i | 206ia | 206ib | 206ic | 206id | 206ie | 206if | | |
| Sample 202j | 206ja | 206jb | 206jc | 206jd | 206je | 206jf | | |
| Sample 202k | 206ka | 206kb | 206kc | 206kd | 206ke | 206kf | | |
| Sample 202l | 206la | 206lb | 206lc | 206ld | 206le | 206lf | | |
| ... | | | | | | | | |
| Sample 202x | | | | | | | | 206xx |

| Sample 202c | Attribute 204a | Attribute 204b | Attribute 204c | Attribute 204d |
|---|---|---|---|---|
| | 206ca | 206cb | 206cc | 206cd |
| Sample 202d | 206da | 206db | 206dc | 206dd |
| Sample 202e | 206ea | 206eb | 206ec | 206ed |
| Sample 202f | 206fa | 206fb | 206fc | 206fd |

Coarse Sample Set 210

| | | | | Attribute 204n |
|---|---|---|---|---|
| | | | | 206cn |
| | | | | 206dn |
| | | | | 206en |
| | | | | 206fn |

| Sample 202g | 206ga | 206gb | 206gc | 206gd | ⋯ | 206gn |
|---|---|---|---|---|---|---|

*Fig. 2B*

Refined Sample Set 220

|            | Attribute 204a | Attribute 204b | Attribute 204c | Attribute 204d |
|---|---|---|---|---|
| Sample 202c | 206ca | 206cb | 206cc | 206cd |
| Sample 202d | 206da | 206db | 206dc | 206dd |
| Sample 202e | 206ea | 206eb | 206ec | 206ed |
| Sample 202f | 206fa | 206fb | 206fc | 206fd |
| Sample 202g | 206ga | 206gb | 206gc | 206gd |
| Sample 202h | 206ha | 206hb | 206hc | 206hd |
| Sample 202i | 206ia | 206ib | 206ic | 206id |
| ⋮ | | | | |
| Sample 202s | 206sa | 206sb | 206sc | 206sd |

*Fig. 2C*

Final Sample Set 230

|            | Attribute 204a | Attribute 204b |
|---|---|---|
| Sample 202c | 206ca | 206cb |
| Sample 202d | 206da | 206db |
| Sample 202e | 206ea | 206eb |
| Sample 202f | 206fa | 206fb |
| Sample 202g | 206ga | 206gb |
| Sample 202h | 206ha | 206hb |
| Sample 202i | 206ia | 206ib |
| ⋮ | | |
| Sample 202s | 206sa | 206sb |

*Fig. 2D*

SELECTING ATTRIBUTES BY PROGRESSIVE SAMPLING TO GENERATE DIGITAL PREDICTIVE MODELS

BACKGROUND

Recent years have seen rapid technological development in utilizing data samples to develop digital predictive models. Indeed, as a result of the proliferation of digital technology, including personal computing devices, mobile computing devices, smartphones, tablets, cloud computing, and the Internet, it is now possible to collect and access large repositories of digital data in relation to a wide range of issues. For example, businesses now collect information regarding customer activities, product performance, or advertising and then utilize the collected information to build models that predict future results based on past results.

Although conventional predictive modeling systems can generate digital models that indicate the likelihood of a particular result, such systems often require a significant amount of time and computing power to operate effectively. This is particularly true in relation to conventional predictive modeling systems that consider a large number of attributes. For example, to generate a relatively accurate predictive model (e.g., a likelihood that a customer will purchase a product) can require more than 200,000 data samples. The size of data increases linearly with regard to the number of attributes. Thus, for instance, to generate an accurate predictive model that considers fifty attributes (e.g., customer age, time of day, customer location, language, as well as other attributes) can require more than 200,000 data samples with fifty different attributes, resulting in a data table of size 10 million entries (i.e., 200,000×50).

As the number of attributes and data samples increase, so does the burden on computing devices that implement conventional predictive modeling systems. For example, in implementations that utilize remote servers to house repositories of data samples, performing a query for ten million data points (e.g., 200,000 samples having 50 different attributes) can impose a significant burden on the remote server in terms of processing power, memory, and time. Furthermore, transferring ten million entries from a remote server to a different computing devices (e.g., a client device utilizing the data samples to generate a predictive model) taxes both the remote server and the computing devices, as well as communication bandwidth resources, resulting in additional delays. Moreover, utilizing ten million entries to generate a digital predictive model can impose significant burdens and delays. Delays (whether at the sever or the client device) ultimately lead to user frustration, dissatisfaction, and an overall reduction in the quality of the user experience.

Some conventional digital predictive modeling systems seek to avoid these problems by limiting the number of attributes that can be utilized to generate a predictive model. For example, some conventional digital predictive modeling systems limit the number of attributes a user can use to generate a digital model. Although limiting the number of attributes reduces the amount of data analyzed and, therefore, reduces the amount of time and computing resources needed to generate a model, this approach introduces additional problems. For instance, placing a blanket limitation on the number of attributes to consider in generating a predictive model often limits the resulting effectiveness of the predictive model. Moreover, conventional modeling systems fail to distinguish between relevant attributes and irrelevant attributes prior to analyzing the attributes. Accordingly, by limiting the number of attributes, conventional predictive modeling systems often omit pertinent data that, if not omitted, would have generated a more accurate predictive model.

Moreover, in addition to ignoring possibly relevant data, such conventional systems can also undermine user confidence and increase client dissatisfaction. Indeed, users often want to include a wide range of attributes in building a predictive model because they do not feel confident in predicting which attributes will prove significant. Furthermore, requiring users to sort through hundreds (or thousands) of attributes to select a limited number of possibly pertinent attributes can require a significant amount of time and lead to user frustration.

These and other problems exist with regard to attribute selection in generating digital predictive models.

BRIEF SUMMARY

One or more embodiments of the present disclosure provide benefits and/or solve one or more of the foregoing or other problems in the art with systems and methods that refine attributes for generating a predictive model by progressively sampling a repository of data samples. In particular, the disclosed systems and methods narrow a set of initial attributes to a focused subset of the initial attributes that are more significant in predicting a target attribute (e.g., a particular result). Specifically, the disclosed systems and methods conduct a coarse sampling of a repository of data samples and utilize the coarse sampling to identify focused attributes (relevant attributes) from the initial attributes. The systems and methods then identify a refined sample set based on the focused attributes and utilize the refined sample set to generate an accurate digital predictive model.

For example, in one or more embodiments, the disclosed systems and methods determine initial attributes for building a digital predictive model to predict a target attribute. Moreover, the disclosed systems and methods identify a coarse sample set from a repository of data samples by querying the repository of data samples for a coarse number of data samples, where each data sample in the coarse sample set includes the initial attributes. In addition, the systems and methods analyze the initial attributes within each data samples of the course sample set to determine a focused subset of the initial attributes that are most relevant for predicting a target attribute within the coarse sample set. Further, the systems and methods identify a refined sample set from the repository of data samples by querying the repository of data samples for a refined number of data samples that include the focused subset of attributes, where the refined number of data samples is larger than the coarse number of data samples. Moreover, the disclosed systems and methods generate a digital predictive model for predicting the target attribute based on the refined sample set.

By utilizing a large number of initial attributes in identifying a coarse sample set (i.e., with a small number of samples), the disclosed systems and methods can identify relevant attributes without expending significant computational resources. Moreover, by utilizing a larger number of data samples in combination with the focused set of attributes (i.e., with a smaller number of attributes), the discloses systems and methods can build a robust and accurate digital predictive model while imposing a reduced computational burden in comparison to conventional systems. Accordingly, the systems and methods can significantly reduce computing resources, computing time, and user time associated with obtaining data samples and generating an accurate digital predictive model.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 2A-2D illustrate a representation of identifying a coarse sample set, a focused sample set, and a final sample set from a repository of data samples in accordance with one or more embodiments;

DETAILED DESCRIPTION

Figure 1A:
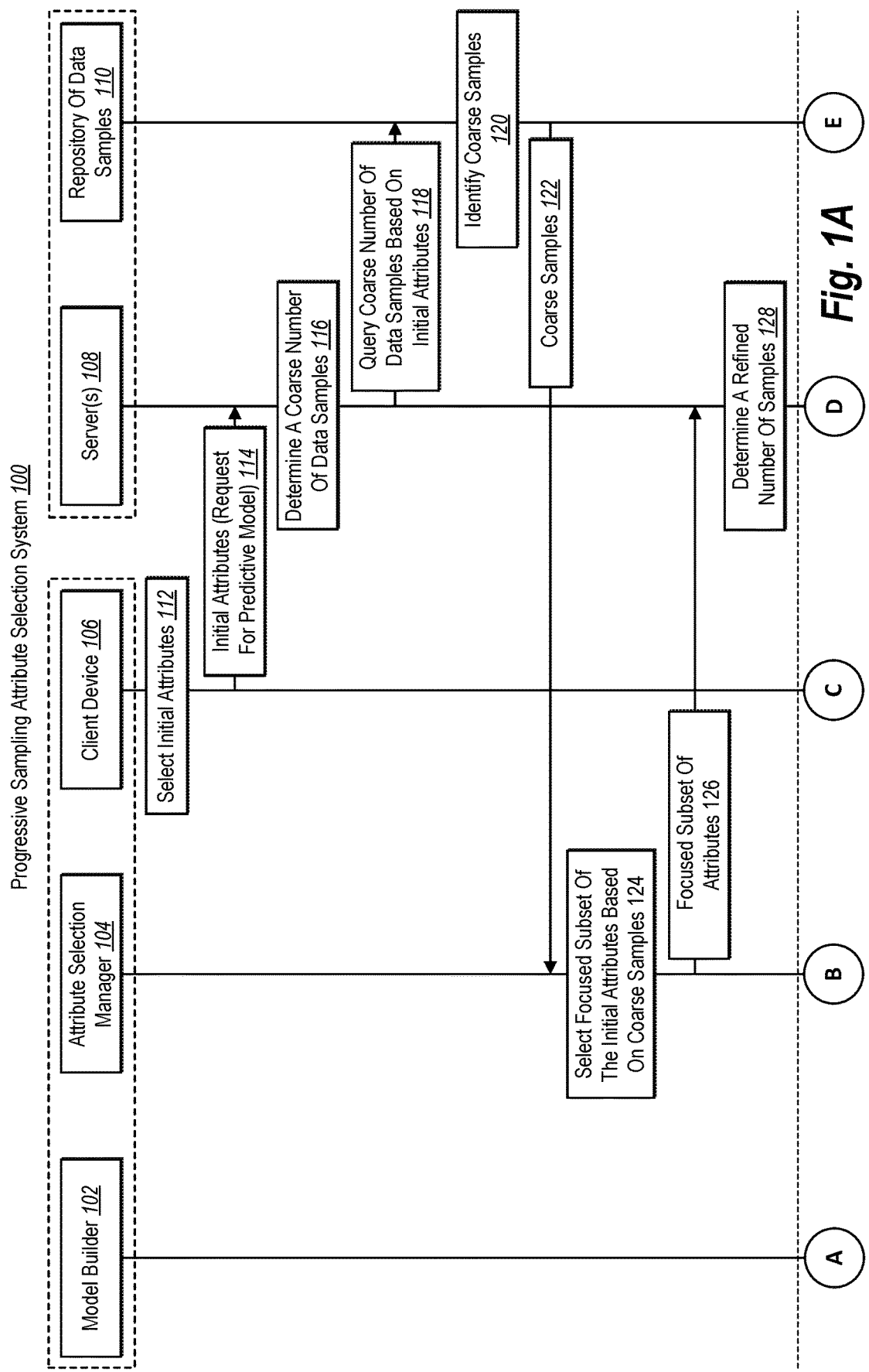
FIGS. 1A-1B illustrate a sequence diagram of a series of acts in a method of improving attribute selection in accordance with one or more embodiments.

One or more embodiments of the present disclosure include a progressive sampling attribute selection system that selects pertinent attributes by iteratively sampling from a repository of data samples. In particular, the progressive sampling attribute selection system iteratively samples a repository of data samples to progressively focus in on attributes that are significant and/or relevant in predicting a target attribute. Moreover, the progressive sampling attribute selection system then utilizes the identified relevant attributes to efficiently generate an accurate digital predictive model for the target attribute.

For instance, in one or more embodiments, the progressive sampling attribute selection system first utilizes initial attributes (e.g., a large number of attributes initially selected by a user) to identify a coarse sample set. The progressive sampling attribute selection system utilizes the coarse sample set to select focused attributes from among the initial attributes that contribute to predicting a target attribute. Moreover, the progressive sampling attribute selection system then utilizes the focused attributes to identify a refined sample set that includes a larger number of data samples. With the refined sample set, the progressive sampling attribute selection system more accurately determines final attributes significant to predicting a target attribute and utilizes the final attributes to generate a digital predictive model.

The progressive sampling attribute selection system provides a number of advantages over conventional predictive modeling systems. By iteratively identifying data samples and focusing on pertinent attributes, the progressive sampling attribute selection system efficiently identifies relevant attributes significant to predicting a target attribute. In particular, the progressive sampling attribute selection system reduces the number of discrete data points obtained, transferred, and analyzed in generating a digital predictive model. Moreover, the progressive sampling attribute selection system reduces the amount of processing power, memory, communication bandwidth, computing time, and user time required to identify relevant attributes and build accurate digital predictive models. Thus, the progressive sampling attribute selection system improves the performance of computing devices by enabling such devices to generate predictive digital models more quickly and efficiently compared to conventional systems.

As mentioned above, in one or more embodiments, the progressive sampling attribute selection system identifies initial attributes for generating a digital predictive model. For instance, the progressive sampling attribute selection system can receive user input that identifies a plurality of initial attributes that a user believes will prove significant in generating the predictive model. Although the number of initial attributes may vary based on a combination of factors, as discussed in detail below, generally, because users are often uncertain which attributes will prove significant in building a digital predictive model, the number of initial attributes is often quite large (e.g., greater than fifty attributes).

Accordingly, in one or more embodiments, the progressive sampling attribute selection system utilizes the initial attributes to identify a coarse sample set. In particular, the progressive sampling attribute selection system identifies a coarse sample set by querying a repository of data samples for a coarse number of data samples, where each data sample includes data corresponding to the initial attributes. For example, in one or more embodiments, the coarse number of data samples is relatively small (e.g., smaller than the number of data samples typically required to generate an accurate digital predictive model), which in turn reduces the computing resource burden and time required to obtain and analyze the course sample set.

Moreover, as mentioned above, the progressive sampling attribute selection system also utilizes the coarse sample set to identify a focused subset of the initial attributes. In particular, in one or more embodiments, the progressive sampling attribute selection system analyzes the coarse sample set to determine which attributes are significant and/or relevant in predicting a target attribute. In this manner, the progressive sampling attribute selection system identifies focused attributes from the initial attributes utilizing the coarse sample set.

Upon identifying focused attributes, the progressive sampling attribute selection system utilizes the focused attributes to generate a refined sample set. In particular, in one or more embodiments, the progressive sampling attribute selection system identifies a refined sample set by querying a repository of data samples for a refined number of data samples, where each data sample in the refined sample set includes data corresponding to the focused attributes. In this manner, the progressive sampling attribute selection system obtains a refined sample set that includes a larger number of data samples (e.g., larger than the coarse number of data samples), which are more particularly focused on relevant attributes (i.e., the focused attributes).

Utilizing the refined sample set that includes the focused attributes, the progressive sampling attribute selection system more accurately hones in on attributes pertinent to predicting a target attribute. For example, in one or more embodiments, the progressive sampling attribute selection system analyzes the refined data samples to identify a final set of attributes (e.g., final attributes most pertinent to predicting a target attribute).

Upon identifying final attributes, the progressive sampling attribute selection system can utilize the final attributes to generate a digital predictive model. For example, in one or more embodiments, the progressive sampling attribute selection system identifies a final sample set reflecting the final attributes and utilizes the final sample set to build a digital predictive model capable of predicting one or more target attributes based on new input attributes. In some embodiments, because the number of final attributes is often much less than the initial set of attributes, the progressive sampling attribute selection system can afford to use a large number of data samples from the data sample repository to include in the final sample set (e.g., hundreds of thousands of data samples or more). Accordingly, due to both identifying the final attributes that are most relevant to predicting a target attribute, as well as analyzing the final attributes using a large number of data samples, the progressive sampling attribute selection system generates an accurate digital predictive model while also providing an efficient and satisfying user experience by reducing the amount of computer, communication, and time resources needed to generate the accurate digital predictive model.

Figure 1B:
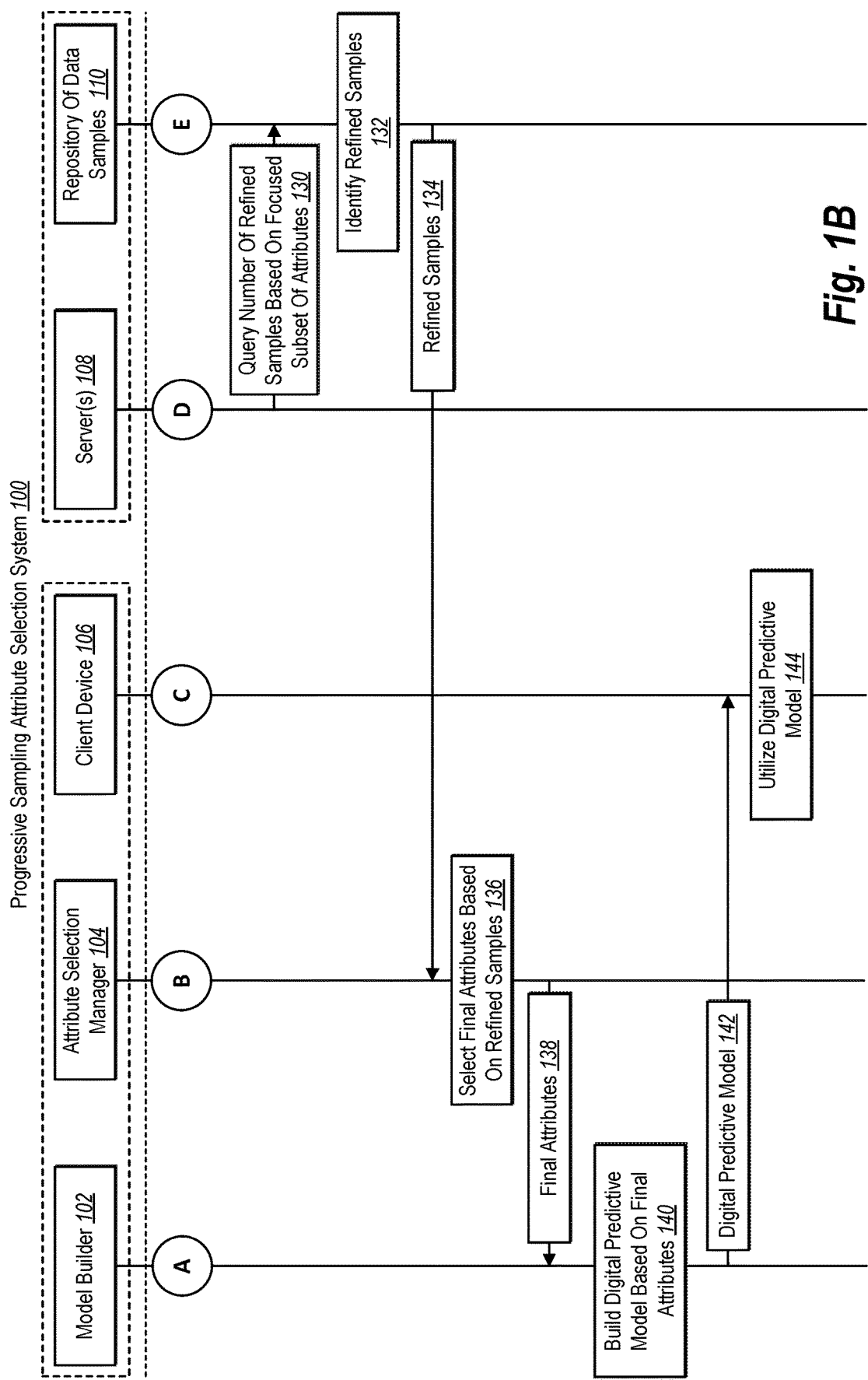

Turning to FIGS. 1A-1B, additional detail will be provided regarding selecting attributes and generating a digital predictive model in accordance with one or more embodiments of the progressive sampling attribute selection system. In particular, FIGS. 1A-1B illustrate a representation of a sequence of acts 112-144 performed by a progressive sampling attribute selection system 100 for generating final attributes to utilize in generating a digital predictive model in accordance with one or more embodiments. In relation to the embodiment of FIGS. 1A-1B, the progressive sampling attribute selection system 100 resides on the client device 106 and the server(s) 108. In particular, the progressive sampling attribute selection system 100 is implemented in part via the client device 106, which, in some embodiments, comprises a model builder 102 and an attribute selection manager 104. Moreover, the progressive sampling attribute selection system 100 is also implemented via the server(s) 108, which includes a repository of data samples 110, as shown in FIG. 1A.

As discussed in more detail below, the progressive sampling attribute selection system 100 can include computer-executable instructions that, when executed by the client device 106 and/or the server(s) 108, cause the client device 106 and/or the server(s) 108 to perform the acts 112-144 shown in the sequence diagram of FIGS. 1A-1B. The client device 106 and/or the server(s) 108 can include a computing device, such as a desktop, laptop, tablet, server device or mobile device such as a smartphone (e.g., a computing device described below in relation to FIG. 8).

Although illustrated in a particular implementation in relation to FIGS. 1A-1B, the model builder 102, the attribute selection manager 104, and the repository of data samples 110 can be implemented as stand-alone components or implemented via different computing devices than shown in FIGS. 1A-1B. For instance, in one or more embodiments, the model builder 102, the attribute selection manager 104, and the repository of data samples 110 reside on the server(s) 108. In other embodiments, the model builder 102, the attribute selection manager 104, and the repository of data samples 110 reside on other computing devices (e.g., on individual client devices and/or servers).

As mentioned above, the progressive sampling attribute selection system 100 can process a large volume of initial attributes to identify focused attributes and/or final attributes that include relevant attributes to generate a digital predictive model. As used herein, the term "digital predictive model" refers to a classification process that, based on input data, predicts one or more results as an output of the classification process. For example, in one or more embodiments, a digital predictive model includes an algorithm that predicts a target attribute based on one or more input attributes. To illustrate, a digital predictive model can receive input attributes (e.g., attributes of a user such as age, gender, occupation, etc.) and predict a target attribute (e.g., whether the user will perform a particular action, such as purchasing a product) based on the input attributes.

As used herein, the term "attributes" refers to any data representative of a feature, quality, category, or characteristic. For example, the term attribute can refer to a feature of a sample, item, object, event, individual, business, customer, advertisement, or product. Attributes can include a variety of different values. For example, attributes can include continuous (e.g., numerical) values, such as an amount of revenue, a number of orders, or a number of times a user activates a device. In addition, attributes can include categorical values, such as a country (e.g., United States).

For example, in relation to a user visiting a website, the term "attribute" can include a location (e.g., a user located in a particular region), time (e.g., a time a user visits the website), language (e.g., language of an advertisement or language spoken by a user), demographic information (e.g., age, gender, sex, or race of the user), action (e.g., a purchase, or number of clicks click on a website), device type (e.g., access by a user to a website utilizing a smartphone), software type (e.g., access by a user to a website utilizing a particular browser), or duration (e.g., duration of a visit to a website). Although the foregoing illustrative example describes attributes in relation to a user visiting a website, the progressive sampling attribute selection system 100 can utilize a variety of attributes in relation to a variety of different samples, items, objects, events, etc.

In one or more embodiments, the progressive sampling attribute selection system 100 maintains a repository of data samples with a plurality of attributes and utilizes the repository of data samples to generate a digital predictive model. For example, in relation to FIG. 1A, the progressive sampling attribute selection system 100 maintains the repository of data samples 110. As used herein, the term "repository of data samples" refers to digital information that reflects data samples and corresponding attributes. For example, a repository of data samples can refer to a database, spreadsheet, matrix, or other digital information that includes data samples comprising attributes corresponding to the data samples.

To illustrate, a repository of data samples can include a matrix of sample users each associated with user attributes. For instance, the repository of data samples 110 includes a plurality of data samples that each correspond to a set of attributes. In particular, each data sample in the repository of data samples 110 reflects a set of attributes of a user. To illustrate, each data sample in the repository of data samples 110 reflects a user's location, time, language, actions, etc. Although the progressive sampling attribute selection system 100 is often discussed herein in terms of users and user attributes, the progressive sampling attribute selection system 100 can perform the described processes, functions, methods and provide the same or similar results for datasets that include varying types of data samples associated with varying types of attributes. For example, the progressive sampling attribute selection system can include attributes related to a particular event (e.g., attributes relating to product age, product location, and product usage, to predict a likelihood of a product failure).

Notwithstanding the particular type of attributes and data samples in the repository of data samples 110, the number of data samples can vary from embodiment to embodiment. It will be appreciated, based on the disclosure herein, that the progressive sampling attribute selection system 100 can utilize a large number of attributes for each data sample in the repository of data samples 110. For example, in one or more embodiments, the progressive sampling attribute selection system 100 generates the repository of data samples 110 with hundreds (or thousands) of attributes corresponding to each individual data sample.

In addition to the set of attributes reflected in the repository of data samples 110, the progressive sampling attribute selection system 100 can also identify and utilize a set of initial attributes. As used herein, the term "initial attributes" refers to attributes originally identified for generating a digital predictive model. In particular, the initial attributes can include attributes identified based on user input that indicates a user selection of attributes to analyze in generating a digital predictive model. In additional embodiments, the progressive sampling attribute selection system 100 identifies initial attributes based on one or more factors, as described further below.

For example, as shown in FIG. 1A, the progressive sampling attribute selection system 100 performs the act 112 via the client device 106 of selecting initial attributes. In particular, the act 112 can include receiving user selections of initial attributes for utilization in generating a digital predictive model. To illustrate, the act 112 can include providing a list of all of the attributes from the repository of data samples 110 for display via the client device 106 and receiving a user selection of one or more (or all) of the attributes from the repository of data samples 110 for generating a digital predictive model.

In one or more embodiments, the progressive sampling attribute selection system 100 automatically selects (or suggests) initial attributes. For example, the progressive sampling attribute selection system 100 can select the initial attributes based on attributes utilized in previous digital predictive models (e.g., final attributes determined to be significant in predicting one or more target attributes). Similarly, the progressive sampling attribute selection system 100 can select the initial attributes based attributes previously selected by a user (e.g., attributes selected by a user in generating previous digital predictive models.). Moreover, in one or more embodiments, if the number of attributes in a repository of data samples does not exceed a threshold (e.g., the repository of data samples contains less than 50 attributes), the progressive sampling attribute selection system 100 can automatically select all the attributes in the repository of data samples.

In addition to initial attributes, the act 112 can also include identifying one or more target attributes. As used herein, the term "target attribute" refers to an attribute to be predicted. For instance, the term target attribute refers to an attribute to be predicted by a digital predictive model. For example, the act 112 can include receiving user selection of a target attribute to predict utilizing a digital predictive model. To illustrate, the progressive sampling attribute selection system 100 can receive user input indicating that the user seeks to predict whether a user visiting a website will click on an advertisement.

As shown in FIG. 1A, upon selecting the initial attributes (and the one or more target attributes), the progressive sampling attribute selection system 100 performs the act 114 of sending the initial attributes (and the one or more target attributes) to the server(s) 108. In particular, the act 114 can include sending the initial attributes to the server(s) 108 in conjunction with sending a request for a digital predictive model. For instance, the client device 106 can send initial attributes and one or more target attributes to the server(s) 108 together with a request to generate a digital predictive model for predicting the one or more target attributes.

As mentioned above, utilizing a large number of initial attributes to generate a digital predictive model can impose significant processing burdens. Accordingly, in one or more embodiments, the progressive sampling attribute selection system 100 utilizes the initial attributes to conduct a coarse sampling of a repository of data samples and then utilizes the coarse sampling to identify a focused subset of initial attributes. In this manner, the progressive sampling attribute selection system 100 can identify a focused subset of relevant attributes from within the initial attributes without imposing significant computational burdens in performing a full analysis in relation to all of the initial attributes.

For example, in relation to FIG. 1A, the progressive sampling attribute selection system 100, via the server(s) 108, performs the act 116 of determining a coarse number of data samples. In particular, the progressive sampling attribute selection system 100 can determine a coarse number of data samples that is smaller than the number of data samples needed to generate an accurate predictive digital model (e.g., smaller than a refined number of data samples discussed further below with respect to act 128). The progressive sampling attribute selection system 100 can determine the coarse number of data samples based on a number of initial attributes, a preset amount, or other factors, as described further below.

Moreover, as shown in FIG. 1A, upon determining the coarse number of data samples the progressive sampling attribute selection system 100, via the server(s) 108, performs the act 118 of querying the repository of data samples 110 for a coarse number of data samples based on the initial attributes. Moreover, in response, the repository of data samples 110 performs the act 120 of identifying a coarse sample set and the act 122 of providing the coarse sample set. Specifically, the repository of data samples 110 identifies the coarse sample set by sampling a coarse number of data samples, where the data samples include the initial attributes, and the repository of data samples 110 then provides the coarse sample set to the attribute selection manager 104.

In performing the acts 118-122, the progressive sampling attribute selection system 100 can also query the repository of data samples 110 for target attributes. Indeed, in addition to querying the repository of data samples 110 for initial attributes, the progressive sampling attribute selection system 100 can also query the repository of data samples 110 for target attributes. Thus, the coarse sample set can data samples that include initial attributes and target attributes. To illustrate, if the progressive sampling attribute selection system 100 is generating a digital predictive model to predict whether a user will purchase a product, the progressive sampling attribute selection system 100 can query the repository of data samples 110 for data samples comprising initial attributes (e.g., location, language, demographic information of each user reflected in the sample) as well as the target attribute (e.g., whether the sample user purchased a product).

Moreover, as mentioned above, in one or more embodiments, the progressive sampling attribute selection system 100 utilizes an attribute selection manager to determine pertinent attributes from a set of data samples. Accordingly, in relation to FIG. 1A, the progressive sampling attribute selection system 100 utilizes the attribute selection manager 104 to perform the act 124 of selecting a focused subset of the initial attributes based on the coarse sample set. Specifically, the attribute selection manager 104 compares the initial attributes and the target attributes from the coarse sample set. To illustrate, the attribute selection manager 104 can access the coarse sample set and compare a user's location (e.g., the initial attribute) with whether the user had purchased a product (e.g., the target attribute). Moreover, the attribute selection manager 104 can access the coarse sample set and compare a second user's location with whether the second user purchased a product (e.g., the target attribute). Based on the comparisons between initial attributes and target attributes in the coarse sample set, the progressive sampling attribute selection system 100 can determine a focused subset of the initial attributes (e.g., determine a focused subset of attributes that are significant in predicting the target attribute).

For example, the attribute selection manager 104 can determine that location has little impact on whether a user purchases a product (i.e., there is no correlation between the initial attribute of location from the coarse sample set and the target attribute of purchase), but that gender has a significant impact on whether a customer purchases a product (i.e., there is a correlation between the initial attribute of gender from the coarse sample set and the target attribute of purchase). Additional detail regarding selecting attributes utilizing an attribute selection manager is further provided below.

As discussed above, the progressive sampling attribute selection system 100 can utilize a focused subset of attributes to identify a refined sample set. In particular, the progressive sampling attribute selection system 100 can query a refined sample set from a repository of data samples utilizing the focused subset of attributes. In this manner, the progressive sampling attribute selection system 100 can obtain a refined sample set that is tailored to a narrow set of attributes (i.e., the focused subset of attributes) so as to reduce the burden on the server(s) 108 and the client device 106 in generating a digital predictive model.

For example, as shown in FIG. 1A, upon selecting a focused subset of the initial attributes, the attribute selection manager 104 performs the act 126 of providing the focused subset of attributes to the server(s) 108. Moreover, the server(s) 108 perform the act 128 of determining a refined number of data samples and the act 130 of querying the repository of data samples 110 for the refined number of data samples based on the focused subset of attributes.

In one or more embodiments, the progressive sampling attribute selection system determines the refined number data samples based on the number of samples needed to generate an accurate digital predictive model. To illustrate, the progressive sampling attribute selection system 100 can determine that the model builder 102 requires 200,000 samples to build an accurate digital predictive model. In response, the progressive sampling attribute selection system can select 200,000 as the refined number of data samples.

As illustrated in relation to the act 130 shown in FIG. 1B, the progressive sampling attribute selection system 100 also queries the repository of data samples 110 for the refined number of data samples. Specifically, the progressive sampling attribute selection system sends a request for a refined number of data samples, wherein the data samples reflect the focused subset of attributes. In response, the repository of data samples 110 performs the act 132 of identifying a refined sample set (e.g., the refined number of data samples reflecting the focused subset of attributes) and the act 134 of providing the refined sample set to the attribute selection manager 104.

As already mentioned, the attribute selection manager 104 can analyze data samples and determine attributes that are significant to predicting a target attribute. Accordingly, as shown, the attribute selection manager 104 performs the act 136 of selecting final attributes based on the refined sample set. Indeed, because the refined sample set includes a refined number of data samples (e.g., a larger number of data samples than the coarse number of data samples) and because the refined sample set includes the focused subset of attributes, the attribute selection manager 104 can more easily identify attributes that are pertinent to predicting a target attribute. Accordingly, as shown, the progressive sampling attribute selection system 100 utilizes the attribute selection manager 104 to analyze the refined sample set and select final attributes (e.g., attributes that are most relevant to predicting the target attribute).

Notably, the progressive sampling attribute selection system 100 identifies the final attributes at the act 136 without having to analyze all of the initial attributes. Indeed, because the progressive sampling attribute selection system 100 initially analyzes a coarse sample set (e.g., a sample set with a smaller number of samples) the progressive sampling attribute selection system 100 can filter irrelevant attributes before obtaining the refined sample set. Moreover, although the refined sample set may include additional samples, in one or more embodiments, the refined sample set excludes a large number of irrelevant attributes, allowing the progressive sampling attribute selection system 100 to avoid significant computational inefficiencies in identifying the final attributes.

As discussed above, the progressive sampling attribute selection system 100 can also utilize final attributes to build a digital predictive model. In particular, as shown in FIG. 1B, the attribute selection manager can perform the act 138 of providing the final attributes to the model builder 102. In one or more embodiments, the act 138 includes providing a final sample set based on the refined sample set and the final attributes. In particular, the progressive sampling attribute selection system 100 can filter the refined sample set based on the final attributes to generate a final sample set (e.g., a final sample set that includes the final attributes). Moreover, the progressive sampling attribute selection system 100 can provide the final sample set to the model builder 102.

As shown in FIG. 1B, upon receiving the final attributes, the model builder 102 performs the act 140 of building a digital predictive model based on the final attributes. In particular, the model builder 102 utilizes a final sample set that includes the final attributes (and the target attributes) to build a digital predictive model. For instance, the model builder 102 can compare the final attributes and the target attributes in the final sample set and generate a digital model that predicts target attributes.

As shown in FIG. 1B, upon building the digital predictive model, the model builder 102 also performs the act 142 of providing the digital predictive model for use on the client device 106. Moreover, the client device 106 performs the act 144 of utilizing the digital predictive model. For example, the client device 106 can utilize the digital predictive model to generate a prediction in relation to one or more target attributes based on new input attributes.

To illustrate, the progressive sampling attribute selection system 100 can receive an indication that a user is visiting a website. The progressive sampling attribute selection system 100 can detect input attributes corresponding to the user (e.g., age, gender, location, or language). The progressive sampling attribute selection system 100 can provide the input attributes to the digital predictive model, and the digital predictive model can generate a prediction in relation to a target attribute (e.g., whether the user will take a particular action, such as purchasing a product).

In addition to utilizing the digital predictive model to predict how a user will act, the progressive sampling attribute selection system 100 can utilize the digital predictive model in a variety of other circumstances. For example, the progressive sampling attribute selection system 100 can utilize the digital predictive model to predict how an advertisement will perform, predict product sales, predict valuable customers, or predict any other target attribute.

Moreover, the progressive sampling attribute selection system 100 can utilize the digital predictive model to make a variety of business decisions. For instance, the progressive sampling attribute selection system 100 can utilize the digital predictive model to make marketing decisions (e.g., what advertising or marketing materials to surface to one or more users based on attributes associated with the users), product decisions (e.g., what products to focus on or when to release what products), or other business decisions (e.g., supply chain or human resource decisions).

It will be appreciated, based on the disclosure herein, that the method described in relation to FIGS. 1A-1B is intended to be illustrative of one or more methods in accordance with the present disclosure, and is not intended to limit potential embodiments. Alternative embodiments can include additional, fewer, or different acts than those articulated in FIGS. 1A-1B. For example, the progressive sampling attribute selection system 100 can omit steps 112 and 114 and identify initial attributes at the server(s) 108.

Additionally, the acts described herein may be performed in a different order, may be repeated or performed in parallel with one another, or may be performed in parallel with different instances of the same or similar acts. For example, although FIGS. 1A-1B illustrate identifying a certain number of iterative sample sets (i.e., progressively sampling a coarse sample set, a refined sample set, and a final sample set) and a certain number of iterative attributes (i.e., the initial attributes, the focused attributes and the final attributes), in one or more embodiments, the progressive sampling attribute selection system 100 repeatedly generates sample sets and selects attributes through additional iterations. For example, the progressive sampling attribute selection system 100 can repeatedly identify additional sample sets and select additional subsets of attributes (i.e., repeat acts 124-134) before ultimately identifying final attributes utilized to generate a digital predictive model.

Turning now to FIGS. 2A-2D additional detail is provided regarding progressive sampling of a repository of data samples to generate a final sample set in accordance with one or more embodiments. In particular, FIG. 2A illustrates a repository of data samples 200 that includes a matrix of samples 202a-202x corresponding to attributes 204a-204x. In particular, each sample has entries corresponding to the attributes 204a-204x, such that the repository of data samples 200 includes sample-specific values 206aa-206xx, where x represents any number. Although the repository of data samples 200 comprises a particular matrix, the progressive sampling attribute selection system 100 can maintain, generate, and/or access a repository of data samples in a variety of different forms.

For instance, although FIG. 2A illustrates the repository of data samples 200 having a particular number of samples and attributes, the progressive sampling attribute selection system 100 can operate in conjunction with a repository of data samples having a different number of samples and/or attributes. For example, the repository of data samples 200 can include millions of samples with thousands of attributes. To illustrate, the repository of data samples 200 can include a sample for each user that visits a website. Moreover, the repository of data samples 200 can include an attribute for any information collected regarding each user (e.g., hundreds or thousands of attributes). Thus, the repository of data samples 200 can include billions of sample-specific values (i.e., values in the matrix).

Given the potentially large volume of the repository of data samples 200, it is generally unfeasible to generate a digital predictive model based on all of the attributes in the repository of data samples 200. Indeed, in one or more embodiments, generating a digital predictive model having more than fifty attributes leads to significant delays and processing burdens in obtaining samples from the repository of data samples 200 and generating a digital predictive model. Accordingly, as discussed above, the progressive sampling attribute selection system 100 identifies a coarse sample set from the repository of data samples 200. In particular, the progressive sampling attribute selection system 100 can generate a coarse sample set that analyzes a large number of attributes (e.g., initial attributes selected by a user) with a reduced number of samples (e.g., a coarse number of data samples).

For example, FIG. 2B illustrates a coarse sample set 210. As shown, the progressive sampling attribute selection system 100 generates the coarse sample set 210 by querying a coarse number of data samples and corresponding initial attributes from the repository of data samples 200. Specifically, the progressive sampling attribute selection system queries the repository of digital samples 200 for the data samples 202c-202g and the initial attributes 204a-204n. This sampling results in the coarse sample set 210 having sample-specific values 206ca-206gn for the data samples 202c-202g and the initial attributes 204a-204n.

Although the embodiment of FIG. 2B illustrates the coarse sample set 210 having a particular number of initial attributes 204a-204n, it will be appreciated that the progressive sampling attribute selection system 100 can utilize a different number of initial attributes in generating the coarse sample set 210. For example, in one or more embodiments, the progressive sampling attribute selection system 100 identifies the initial attributes 204a-204n based on user selection. Accordingly, the progressive sampling attribute selection system 100 can receive initial attributes that comprise all of the attributes 204a-204x from the repository of data samples 200. Similarly, the progressive sampling attribute selection system 100 can receive user selection of a different number of initial attributes (e.g., one-hundred, two-hundred, one-thousand or more) from the repository of data samples 200. In other examples, the number of initial attributes is less than one-hundred (e.g., fifty, twenty, or less depending on a particular data set within the repository of data samples 200).

As shown in FIG. 2B, the number of samples utilized in the coarse sample set 210 is significantly smaller than the number of data samples in the repository of data samples 210. Indeed, as mentioned above, the progressive sampling attribute selection system can determine a coarse number of data samples to ensure that the coarse sample set 210 does not impose undue computational burdens. Specifically, in one or more embodiments, the progressive sampling attribute selection system 100 selects a coarse number of data samples based on the number of initial attributes. For example, if the number of initial attributes increases, the progressive sampling attribute selection system 100 can decrease the number of samples. In this manner, the progressive sampling attribute selection system 100 can control the number of sample-specific values included in the coarse sample set 210 and control the computational requirements for obtaining and analyzing the coarse sample set 210.

As mentioned above, upon generating a coarse sample set, the progressive sampling attribute selection system 100 can utilize the coarse sample set to identify a focused subset of the initial attributes. Moreover, the progressive sampling attribute selection system 100 can then utilize the focused attributes set to obtain a refined sample set from a repository of data samples. For example, FIG. 2C illustrates a refined sample set 220. As shown, the refined sample set 220 comprises a focused subset of attributes 204a-204d. Moreover, the refined sample set 220 comprises data samples 202c-202s. In particular, the refined sample set 220 includes a refined number of data samples (i.e., the data samples 202c-202s) larger than the coarse number of data samples (e.g., the data samples 202a-202n) in the coarse sample set 210. Accordingly, the refined sample set 220 reflects a more detailed sampling (i.e., a larger number of samples) in relation to a smaller number of attributes (i.e., the focused subset of attributes).

Although FIG. 2C illustrates overlap between the data samples in the refined sample set 220 and the coarse sample set 210 (e.g., data sample 202c is in both sample sets), the particular data samples illustrated in relation to FIGS. 2B-2C are for illustrative purposes only and not limiting to the particular example data samples illustrated. Indeed, one of ordinary skill in the art will appreciate that, in some circumstances, the coarse sample set 210 will not include any of the data samples from the refined sample set 220.

As mentioned above, the progressive sampling attribute selection system 100 can also generate a final sample set. In particular, the progressive sampling attribute selection system 100 can utilize a refined sample set to identify final attributes. Moreover, the progressive sampling attribute selection system 100 can then utilize the final attributes to generate a final sample set from a repository of data samples. For example, FIG. 2D illustrates a final sample set 230. As shown, the progressive sampling attribute selection system 100 generates the final sample set 230 based on the final attributes 204a, 204b (i.e., a smaller number of attributes than included in the refined sample set 220). More particularly, the progressive sampling attribute selection system 100 generates the final sample set 230 by obtaining the data samples 202c-202s with the final attributes 204a, 204b.

In one or more embodiments, the progressive sampling attribute selection system 100 generates a final sample set based on a refined sample set. In particular, the progressive sampling attribute selection system 100 can filter a refined sample set based on final attributes to generate a final sample set. To illustrate, in relation to FIG. 2D, the progressive sampling attribute selection system 100 generates the final sample set 230 by filtering the refined sample set 220 based on the final attributes 204a, 204b. Specifically, the progressive sampling attribute selection system 100 generates the final sample set 230 by removing the attributes 204c, 204d from the refined sample set 220. Accordingly, the final sample set 230 includes the same data samples 202c-202s as the refined sample set 220, but with fewer attributes. In this manner, the progressive sampling attribute selection system 100 can generate a final sample set that focuses on the most critical attributes (i.e., the final attributes 204a, 204b) with sufficient data samples to generate an accurate digital predictive model.

Although the embodiment of FIG. 2D illustrates generating the final sample set 230 by filtering the refined sample set 220, in one or more embodiments, the progressive sampling attribute selection system 100 generates the final sample set 230 utilizing a different approach. For example, rather than filtering the refined sample set 220, the progressive sampling attribute selection system 100 can generate the final sample set 230 from the repository of data samples 200 (e.g., by querying the repository of data samples 200 for samples comprising the final attributes 204a, 204b). In such embodiments, the final sample set may include a greater number of data samples compared to the refined sample set 220.

In addition, although FIGS. 2C and 2D illustrate a particular number of attributes (e.g., four attributes in the refined sample set 220 and two attributes in the final sample set 230), the progressive sampling attribute selection system 100 can generate refined sample sets and final sample sets with a different number of attributes. For example, in one or more embodiments, the progressive sampling attribute selection system 100 receives one-hundred initial attributes, generates a refined sample set with twenty-five focused attributes, and generates a final sample set with fifteen final attributes. Of course, the number of attributes may vary from one embodiment to the next depending on a particular data set, a particular target attribute, or a particular configuration or setting of the progressive sampling attribute selection system 100.

Figure 3A:
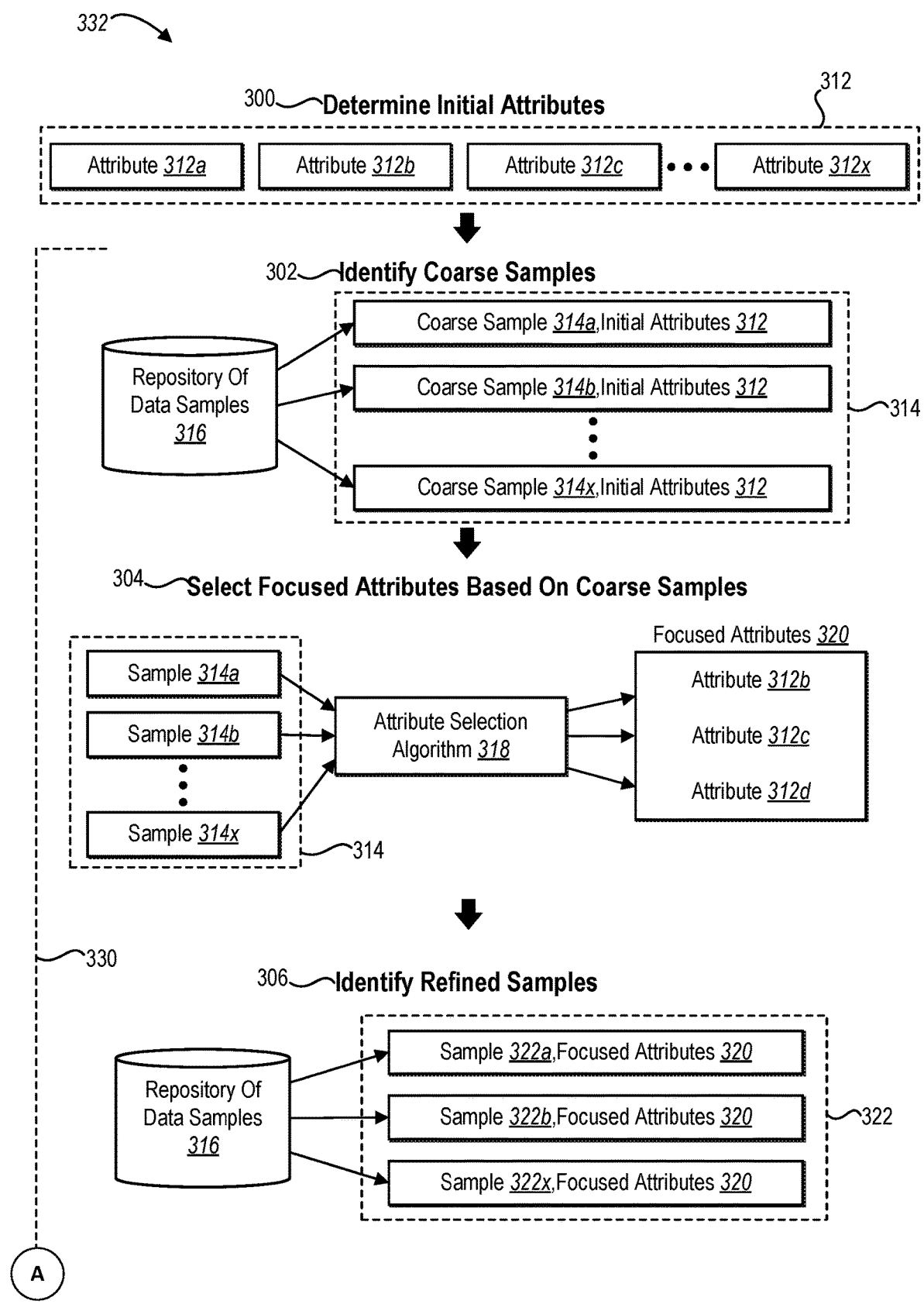
FIGS. 3A-3B illustrate a representation of steps/acts in a method of generating a digital predictive model in accordance with one or more embodiments.
Figure 3B:
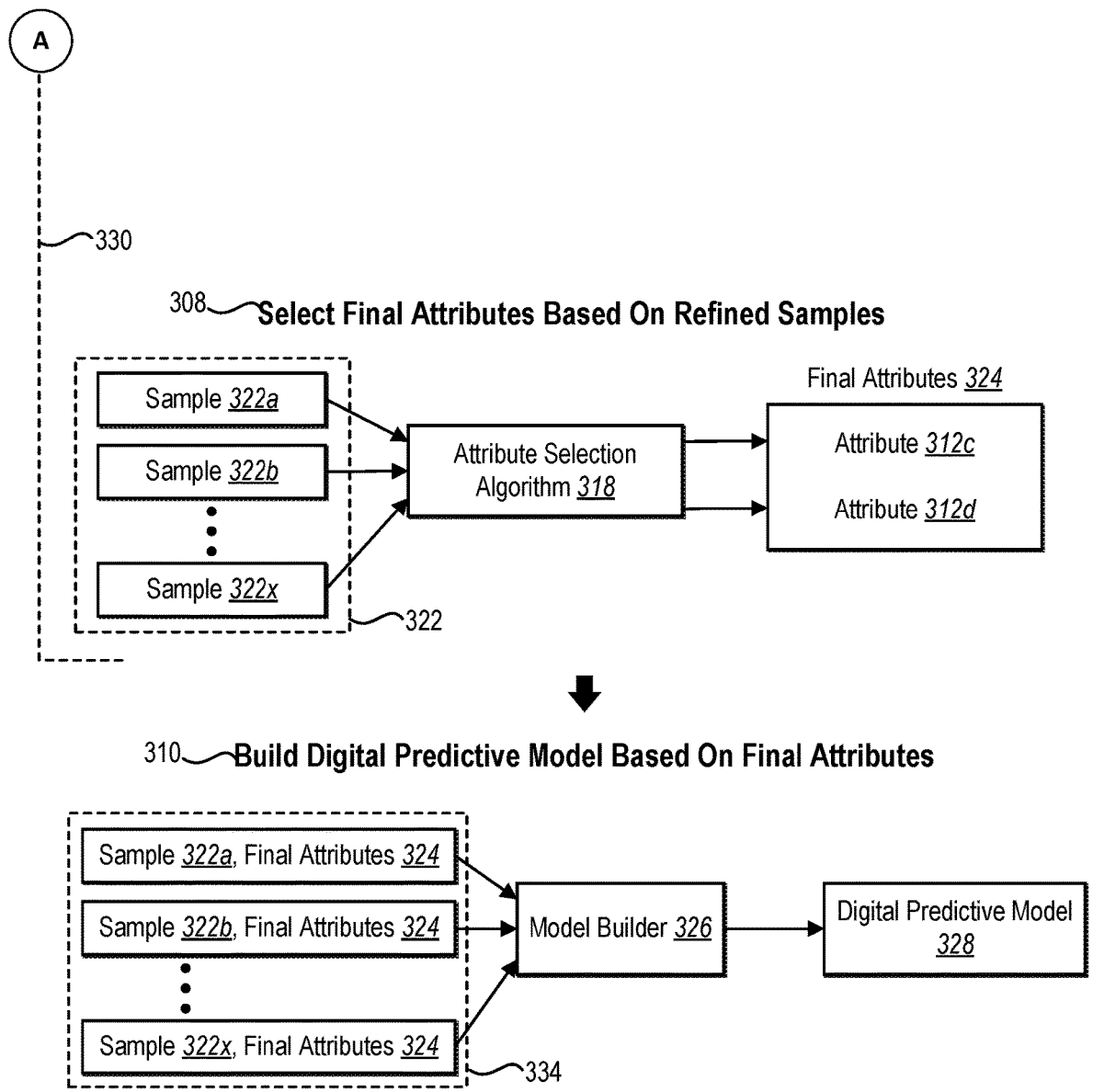

In addition to progressively generating sample sets (as illustrated in FIGS. 2A-2D), the progressive sampling attribute selection system 100 can also focus in on attributes relevant to predicting a target attribute, and then generate a predictive model based on the relevant attributes. FIGS. 3A-3B illustrate acts 300-310 in a method 332 of progressively sampling a repository of data samples to identify focused attributes and final attributes utilized to generate a digital predictive model. In particular, FIGS. 3A-3B illustrate that the progressive sampling attribute selection system 100 implement the method 332 by performing the act 300 of determining initial attributes, the act 302 of identifying a coarse sample set, the act 304 of selecting focused attributes based on the coarse sample set, the act 306 of identifying a refined sample set, the act 308 of selecting final attributes based on the refined sample set, and the act 310 of building a digital predictive model based on the final attributes.

Moreover, as illustrated in FIGS. 3A-3B the method also includes a step 330 for identifying final attributes from initial attributes to utilize in generating a digital predictive model. In particular, as shown in FIGS. 3A-3B, the step 330 for identifying final attributes from initial attributes to utilize in generating a digital predictive model includes the acts 302-308.

As shown in FIG. 3A, the act 300 includes determining a plurality of initial attributes 312 (i.e., the plurality of initial attributes 312 comprising individual attributes 312a-312x). The progressive sampling attribute selection system 100 can identify the initial attributes 312 in a variety of ways. For example, in one or more embodiments, the progressive sampling attribute selection system 100 identified the initial attributes 312 from a repository of data samples (e.g., identifies all attributes included in a repository of data samples). Moreover, as mentioned above, in one or more embodiments, the progressive sampling attribute selection system 100 identifies the initial attributes 312 based on user input (e.g., user selection of one or more attributes). Furthermore, in one or more embodiments, the progressive sampling attribute selection system 100 identifies the initial attributes 312 based on previously utilized attributes (e.g., attributes previously selected by the user for generating a digital predictive model).

The act 300 can also include determining whether the number of initial attributes 312 exceeds an attribute threshold. For example, in one or more embodiments, the progressive sampling attribute selection system 100 only performs the acts 302-308 (i.e., the step 330) upon first determining that the number of initial attributes 312 exceeds an attribute threshold. Indeed, if the number of initial attributes 312 is a small number (e.g., two attributes), the progressive sampling attribute selection system 100 may have no need to reduce the number of attributes to efficiently generate a digital predictive model. Accordingly, the progressive sampling attribute selection system 100 can compare the number of initial attributes 312 to an attribute threshold (e.g., fifty attributes). If the number of initial attributes 312 exceeds the attribute threshold, the progressive sampling attribute selection system 100 can proceed to perform the acts 302-308.

As mentioned previously, the act 300 can also comprise identifying one or more target attributes. For example, the progressive sampling attribute selection system 100 can determine (e.g., based on user input) one or more target attributes that a user seeks to predict utilizing a digital predictive model.

As shown, the method 332 can also include the act 302 of identifying a coarse sample set 314. In particular, the act 302 includes identifying the coarse sample set 314 that includes data samples 314a-314x corresponding to the initial attributes 312. As illustrated in FIG. 3A, in one or more embodiments, the progressive sampling attribute selection system 100 identifies the coarse sample set 314 by querying a repository of data samples 316. Specifically, the progressive sampling attribute selection system 100 can sample the repository of data samples 316 to identify the data samples 314a-314x corresponding to the initial attributes 312.

The act 302 can also include determining a coarse number of data samples and identifying the coarse sample set 314 based on the determined coarse number of data samples. The progressive sampling attribute selection system 100 can determine a coarse number of data samples utilizing a variety of approaches. For example, in one or more embodiments, the progressive sampling attribute selection system 100 determines the coarse number of data samples based on the number of initial attributes, the refined number of data samples, a desired number of data samples (e.g., a desired number of data samples needed to generate an accurate digital predictive model), and/or an attribute threshold.

For instance, in one or more embodiments, the progressive sampling attribute selection system 100 determines the coarse number of data samples based on the number of initial attributes. In particular, if the number of initial attributes increases, the progressive sampling attribute selection system 100 can decrease the coarse number of data samples.

Similarly, the progressive sampling attribute selection system 100 can determine the coarse number of data samples based on the refined number of data samples and/or a desired number of data samples (e.g., a desired number of data samples to generate an accurate predictive digital model). For example, if the refined number of data samples (or the desired number of data samples) increases, the progressive sampling attribute selection system 100 can increase the coarse number of data samples. Moreover, if the refined number of data samples (or the refined number of data samples) decreases, the progressive sampling attribute selection system 100 can decrease the coarse number of data samples.

Furthermore, the progressive sampling attribute selection system 100 can determine the coarse number of data samples based on an attribute threshold. For example, if the attribute threshold increases (e.g., because of availability of processing resources at a particular time), the progressive sampling attribute selection system 100 can increase the coarse number of data samples. Similarly, the if the attribute threshold decreases, the progressive sampling attribute selection system 100 can decrease the coarse number of data samples.

For example, in one or more embodiments, the progressive sampling attribute selection system 100 utilizes the following equation to determine the coarse number of data samples, N':

$$N' = N \times \frac{T}{M} \qquad \text{Equation (1)}$$

where N is the refined number of data samples (or the desired number of data samples in generating the digital predictive model), T is an attribute threshold, and M is the number of initial attributes.

Although Equation (1) illustrates one approach for determining the coarse number of data samples, the progressive sampling attribute selection system 100 can also utilize other equations or approaches. For example, rather than utilizing an inverse power function for the relationship between the coarse number of data samples, N', and the number of initial attributes, M, the progressive sampling attribute selection system 100 can utilize a linear function, a quadratic function, a polynomial function, or an exponential function. Similarly, rather than utilizing a direct linear function for the relationship between the coarse number of data samples, N', and the refined number of data samples N or the attribute threshold T, the progressive sampling attribute selection system 100 can also utilize a power function, a quadratic function, a polynomial function, or an exponential function.

As mentioned, the progressive sampling attribute selection system 100 can identify the coarse sample set 314 based on the determined coarse number of data samples. In particular, the progressive sampling attribute selection system 100 can query the repository of data samples 316 for the determined coarse number of data samples.

As illustrated in FIG. 3A, upon identifying a coarse sample set, the progressive sampling attribute selection system 100 can also perform the act 304 of selecting focused attributes based on the coarse sample set 314. In particular, as shown, the progressive sampling attribute selection system 100 provides the coarse sample set 314 to an attribute selection algorithm 318. Moreover, the attribute selection algorithm 318 analyzes the coarse sample set 314 and determines the focused attributes 320 (e.g., the attributes 312b-312d).

The attribute selection algorithm 318 can select attributes that contribute to predicting one or more target attributes. In particular, in one or more embodiments, the attribute selection algorithm 318 selects attributes by comparing the initial attributes from the coarse sample set 314 with the target attributes from the coarse sample set 314. For example, the attribute selection algorithm 318 can analyze a data sample 314a from the coarse sample set 314 and compare the attributes corresponding to the data sample 314a with the target attribute corresponding to the data sample 314a.

To illustrate, the coarse sample set 314 can include a data sample 314a that includes the attributes of a user. The attribute selection algorithm 318 can analyze the attributes of the user and compare the attributes to a target attribute (e.g., whether the user purchased a product). The attribute selection algorithm 318 can also compare the attributes of the remaining users in the remaining data samples to the target attributes corresponding to the data samples. By comparing the attributes and target attributes from the coarse data samples 314 the progressive sampling attribute selection system 100 can determine which attributes are significant in predicting the one or more target attributes. In addition, the progressive sampling attribute selection system 100 can determine which attributes are irrelevant for predicting the one or more target attributes. Moreover, the progressive sampling attribute selection system 100 can select the focused attributes 320 from the initial attributes 312.

The attribute selection algorithm 318 can comprise a variety of different algorithms for selecting pertinent attributes from a sample set. For example, in one or more embodiments, the attribute selection algorithm 318 comprises a feature selection algorithm as described in the following patent application: Wei Zhang, Shiladitya Bose, Said Kobeissi, Scott Tomko, Jeremy King, Efficient Feature Exploration for Predictive Models Using Semantic Classification And Generative Filtering, (filed Mar. 7, 2016) the entirety of which is incorporated by reference herein. One of ordinary skill in the art will appreciate that a variety of feature selection algorithms exist for selecting attributes from a sample set.

As illustrated in FIG. 3A, upon selecting focused attributes, the progressive sampling attribute selection system 100 can perform the act 306 of identifying a refined sample set 322 (i.e., a sample set comprising data samples 322a-322x). In particular, as shown, the progressive sampling attribute selection system 100 can identify the refined sample set 322 from the repository of data samples 316. Specifically, the progressive sampling attribute selection system 100 can identify the refined sample set 322 by querying the repository of data samples 316 for a refined number of data samples, where the data samples comprise the focused attributes 320.

As mentioned above, in one or more embodiments, the progressive sampling attribute selection system 100 determines the refined number of data samples. In particular, in one or more embodiments, the progressive sampling attribute selection system 100 determines the refined number of data samples based on the data samples needed to generate an accurate digital predictive model. Accordingly, in one or more embodiments, the progressive sampling attribute selection system 100 selects a refined number of data samples larger than a coarse number of data samples.

As shown in FIG. 3B, the progressive sampling attribute selection system 100 also performs the act 308 of selecting final attributes based on the refined sample set 322. In particular, as shown in FIG. 3B, the progressive sampling attribute selection system 100 can provide the refined sample set 322 to the attribute selection algorithm 318. The attribute selection algorithm 318 analyzes the refined sample set 322 and selects the final attributes 324 (i.e., the attributes 312c, 312d).

As mentioned above, the progressive sampling attribute selection system 100 can utilize a variety of algorithms for the attribute selection algorithm 318. In one or more embodiments, however, the attribute selection algorithm 318 determines the final attributes by comparing the focused attributes from the refined sample set 322 with the target attributes corresponding to the refined sample set 322. For example, the attribute selection algorithm 318 can identify the data sample 322a from the refined sample set 322. The attribute selection algorithm 318 can compare the focused attributes corresponding to the data sample 322a with the target attribute corresponding to the data sample 322a. Similarly, the attribute selection algorithm 318 can compare the focused attributes corresponding to the remainder of the data samples in the refined sample set 322 with the target attributes corresponding to the remainder of the data samples in the refined sample set 322. Thus, the progressive sampling attribute selection system can determine which of the attributes from the refined sample set 322 are most significant in predicting the target attribute. In this manner, the attribute selection algorithm 318 can determine the final attributes 324.

As shown in FIG. 3B, the progressive sampling attribute selection system 100 can also perform the act 310 of building a digital predictive model based on the final attributes 324. In particular, the progressive sampling attribute selection system 100 can generate a final sample set 334 and provide the final sample set 334 to a model builder 326. Moreover, the model builder 326 can generate a digital predictive model 328.

As described above, in one or more embodiments, the progressive sampling attribute selection system 100 generates the final sample set 334 based on the refined sample set 322. For example, the progressive sampling attribute selection system 100 can filter the refined sample set 322 based on the final attributes 324 to generate the final sample set 334.

As shown, the model builder 326 can analyze the final sample set 334 and generate the digital predictive model 328. The model builder 326 can comprise a variety of algorithms that convert sample data to a digital predictive model. For instance, in one or more embodiments, the model builder 326 comprises a machine learning algorithm that is trained based on sample data and corresponding attributes to predict a target attribute. Specifically, the model builder 326 can comprise a logistic regression algorithm. Similarly, the model builder 326 can comprise a random forest algorithm.

As mentioned previously, upon generating the digital predictive model 328, the progressive sampling attribute selection system 100 can also utilize the digital predictive model. In particular, the digital predictive model 328 can analyze input attributes to predict one or more target attributes. For example, progressive sampling attribute selection system 100 can utilize the digital predictive model 328 to identify valuable customers or estimate a likelihood that a product will be purchased.

The progressive sampling attribute selection system 100 can significantly reduce the computational burden on computing devices generating digital predictive models. In particular, the progressive sampling attribute selection system 100 can reduce the complexity of sampling a repository of data samples and utilizing data samples to generate a digital predictive model. Specifically, the progressive sampling attribute selection system 100 can reduce the time complexity (e.g., the amount of time and processing power required to obtain and analyze digital samples) as well as the storage complexity (e.g., the amount of storage required for digital samples).

Figure 4:
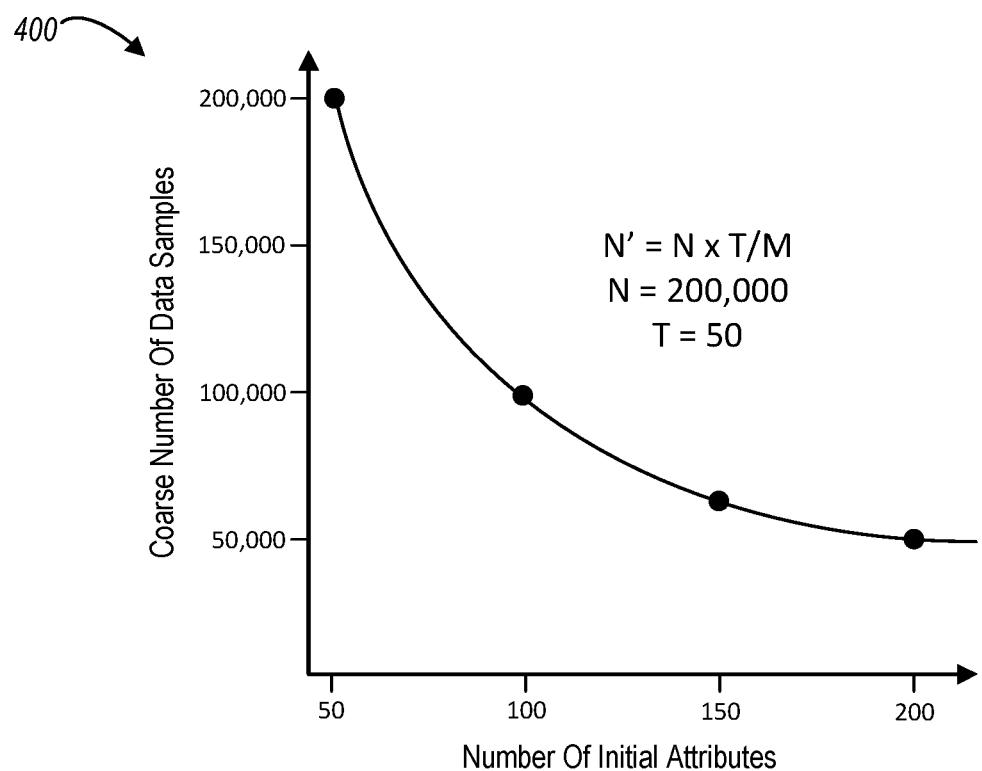
FIG. 4 illustrates a representation of selecting a coarse number of data samples to control for complexity in computer processing and storage in accordance with one or more embodiments.
Figure 4:
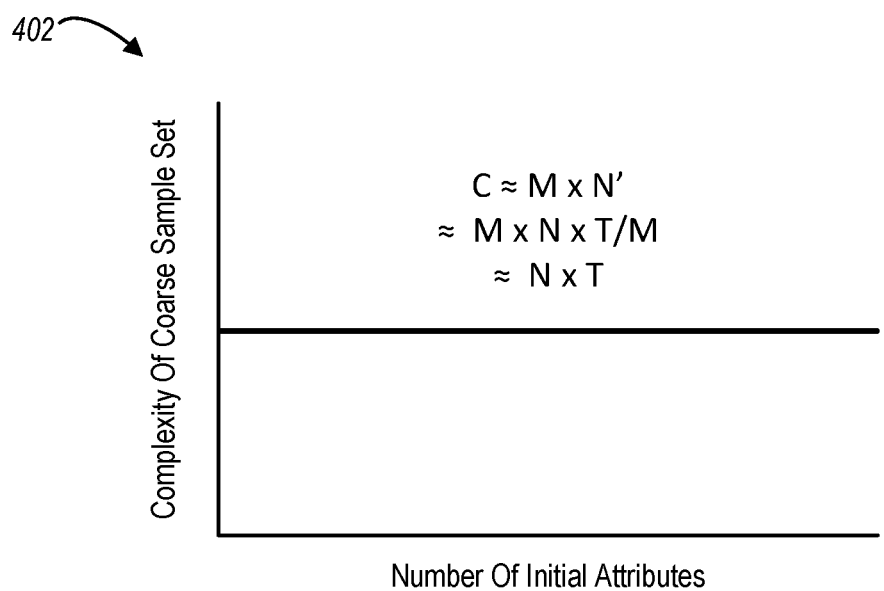

For instance, in one or more embodiments, the progressive sampling attribute selection system 100 controls the amount of complexity associated with obtaining, analyzing, and storing coarse sample sets. For example, FIG. 4 illustrates a graph 400 of a coarse number of samples obtained by the progressive sampling attribute selection system 100 as a function of the number of initial attributes in accordance with one or more embodiments. Specifically, the graph 400 illustrates the coarse number of data samples generated by the progressive sampling attribute selection system 100 utilizing Equation 1, with N=200,000 (i.e., the refined number of data samples or the desired number of data samples is set to 200,000) and T=50 (i.e., the attribute threshold is set to 50).

As shown in relation to the embodiment of FIG. 4, the progressive sampling attribute selection system 100 automatically adjusts the coarse number of data samples based on the number of initial attributes. As the number of initial attributes increases the coarse number of data samples decreases.

More specifically, the progressive sampling attribute selection system 100 decreases the coarse number of data samples such that the complexity of the coarse sampling remains constant regardless of the number of attributes. Indeed, the complexity of storing and processing the coarse sample set is directly proportional to the number of attributes and the number of samples. In other words:

$$C \approx M \times N'$$

where C is the complexity of the coarse sampling, while M and N' retain their definitions from above. Substituting the equation for N' from above reveals that the complexity of the coarse sampling is unrelated to the number of attributes; rather, the complexity of the coarse sample set is a function of the refined number of data samples (or the number of desired data samples) and the attribute threshold:

$$C \approx N \times T$$

Because, in one or more embodiments, the user can select the number of desired data samples and/or the attribute threshold, the user can control the complexity of obtaining, analyzing, and storing the coarse sample set.

Indeed, FIG. 4 also illustrates a graph 402 of the complexity of coarse sampling as a function of the number of attributes in accordance with one or more embodiments. By selecting the coarse number of data samples as illustrated in the graph 400, the graph 402 illustrates that the complexity of obtaining and analyzing the coarse sample set remains constant as the number of initial attributes changes.

This is significant because the progressive sampling attribute selection system 100 identifies focused attributes from the coarse sample set with a predictable outlay of computing resources. Moreover, with the focused attributes in hand, the progressive sampling attribute selection system 100 generates final attributes and a digital predictive model with reduced computing resources.

For example, consider a circumstance where a user selects 200 initial attributes that may be significant in generating a digital predictive model for a target attribute. Moreover, assume that the digital predictive model needs 200,000 data samples to accurately generate the digital predictive model. Furthermore, assume that the digital predictive model takes a significant amount of time to generate a digital predictive model with more than 50 attributes (therefore, the attribute threshold is set to 50). As illustrated by the graph 400, the progressive sampling attribute selection system 100 can generate 50,000 coarse data samples, with a complexity proportionate to 50N (i.e., 50 attributes for 200,000 data samples).

It has been found empirically that, on average, analysis of a coarse sample sets by an attribute selection algorithm results in selecting approximately 25 focused attributes. Accordingly, in relation to the present example, the progressive sampling attribute selection system 100 identifies a refined sample set having 200,000 data samples, with a complexity proportionate to 25N (i.e., 25 attributes for 200,000 data samples). Accordingly, in total, the progressive sampling attribute selection system 100 introduces an average complexity of 75N (i.e., 50N+25N) in obtaining and analyzing both a coarse sample set and refined sample set.

In contrast, conventional digital predictive modeling systems would sample 200,000 data samples with 200 different attributes. This results in a complexity of 200N (i.e., 100 attributes for 200,000 data samples). Accordingly, in relation to this particular example, the progressive sampling attribute selection system 100 can reduce the complexity by 63% (i.e., 200N versus 75N).

The amount of improvement only increases as the number of initial attributes increases. For example, Table 1 illustrates the reduction in time complexity by utilizing one or more embodiments the progressive sampling attribute selection system 100 in comparison to conventional digital prediction systems. As shown, if a user seeks to utilize 1000 initial attributes, the progressive sampling attribute selection system 100 can provide a 93% reduction in time complexity.

TABLE 1

Improvement in Time Complexity

| M (number of attributes) | Complexity (Baseline) | Average Complexity (Proposed) | Time Reduction |
|---|---|---|---|
| 100 | 100N | ~75N | ~58% |
| 200 | 200N | ~75N | ~63% |
| 300 | 300N | ~75N | ~75% |
| 500 | 500N | ~75N | ~85% |
| 1000 | 1000N | ~75N | ~93% |

The progressive sampling attribute selection system 100 can also improve space complexity (i.e., the amount of local memory required to store digital samples). As illustrated by the previous example, a computing device storing the coarse sample set would require space proportionate to 50N (i.e., 50 attributes for 200,000 data samples). The progressive sampling attribute selection system 100 could then delete the coarse sample set and utilize a refined sample set with space complexity proportionate to 25N. Accordingly, the progressive sampling attribute selection system 100 requires space complexity proportionate to 50N. In contrast, conventional systems require space complexity of 200N (i.e., 200 attributes for 200,000 data samples). Accordingly, in relation to the previous example, the progressive sampling attribute selection system 100 can reduce space complexity by 75% (i.e., 50N versus 200N).

The amount of improvement only increases as the number of initial attributes increases. For example, Table 2 illustrates the reduction in space utilizing one or more embodiments the progressive sampling attribute selection system 100 in comparison to conventional digital prediction systems. As shown, if a user seeks to utilize 1000 initial attributes, the progressive sampling attribute selection system 100 can reduce space requirements by 95%.

TABLE 2

Improvement In Space Complexity

| M (number of attributes) | Complexity (Baseline) | Complexity (Proposed) | Space reduction |
|---|---|---|---|
| 100 | 100N | 50N | 50% |
| 200 | 200N | 50N | 75% |
| 300 | 300N | 50N | 83% |
| 500 | 500N | 50N | 90% |
| 1000 | 1000N | 50N | 95% |

The foregoing examples illustrate some of the efficiencies that can result from implementing the progressive sampling attribute selection system 100. Indeed, by coarse sampling with less data samples, the progressive sampling attribute selection system 100 can obtain a partial view of the data (although perhaps not as comprehensive as a case of setting N=200 k). That said, the partial view is good enough to eliminate most unrelated attributes. The reason is that for many prediction tasks, many attributes can be virtually irrelevant (e.g., where the attribution set is very large). Even a partial view reflected in the coarse sample set (which may still contain a large number of samples, e.g., 30 k+ for M=300) is enough to safely identify unrelated attributes. Therefore, in the first stage, the coarse sampling and feature selection can help to eliminate most (~90%) attributes. Then in the second stage, the progressive sampling attribute selection system 100 can perform full-fledge sampling and model building with a small number attributes, so as to build an accurate model. Extensive experiments show the implemented module produces reliable results.

In sum, the progressive sampling attribute selection system 100 can provide significant reductions in the amount of processing power, time, and memory required to obtain and analyze data samples to generate digital predictive models. In particular, by utilizing a coarse sample set to identify focused attributes and then utilizing a refined sample set to identify final attributes, the progressive sampling attribute selection system 100 can generate a digital predictive model with reduced time and space complexity compared to conventional systems.

Figure 5:
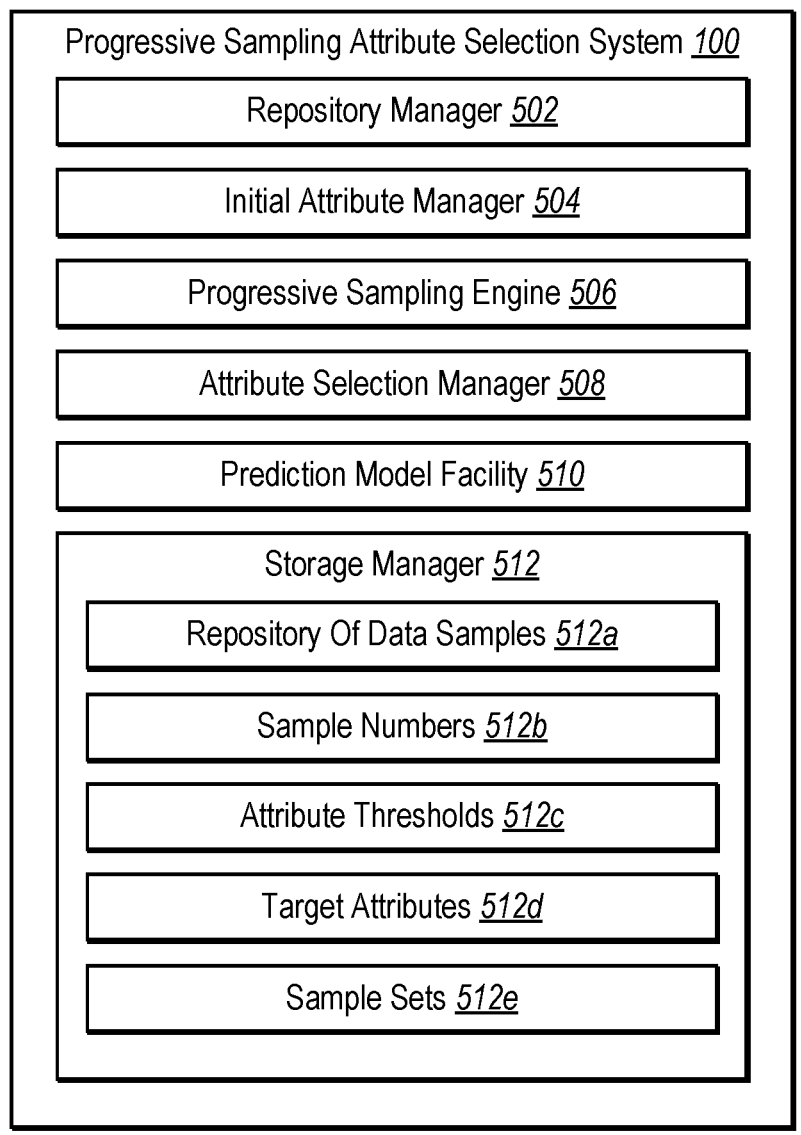
FIG. 5 illustrates a schematic diagram illustrating a progressive sampling attribute selection system in accordance with one or more embodiments.

Turning now to FIG. 5, additional detail is provided regarding components and capabilities of one embodiment of the progressive sampling attribute selection system 100. As shown, the progressive sampling attribute selection system 100 may include, but is not limited to a repository manager 502, an initial attribute manager 504, a progressive sampling engine 506, an attribute selection manager 508, a prediction model facility 510, and a storage manager 512 (comprising a repository of data samples 512a, sample numbers 512b, attribute thresholds 512c, target attributes 512d, and sample sets 512e).

As just mentioned, and as illustrated in FIG. 5, the progressive sampling attribute selection system 100 may include the repository manager 502. The repository manager 502 can generate, maintain, create, collect, and/or manage a repository of data samples (e.g., the repository of data samples 512a). For instance, the repository manager 502 can monitor data sources, collect data samples, and compile data samples into the repository of data samples 512a. To illustrate, the repository manager 502 can monitor visitors to a web site, detect attributes of the visitors, and collect the attributes into the repository of data samples 512a. The repository manager 502 can maintain a repository of data samples that includes data samples corresponding to users, customers, products, advertisements, objects, individuals, businesses, events or other data.

As just mentioned, and as illustrated in FIG. 5, the progressive sampling attribute selection system 100 also includes the initial attribute manager 504. The initial attribute manager 504 can identify, determine, receive, and/or generate initial attributes. For example, in one or more embodiments, the initial attribute manager 504 identifies initial attributes based on user selection of attributes reflected in the repository of data samples 512a.

In addition, as shown in FIG. 5, the progressive sampling attribute selection system 100 also includes the progressive sampling engine 506. The progressive sampling engine 506 can query, sample, identify, search for, compile, generate, and/or create sample sets. In particular, the progressive sampling engine 506 can iteratively identify a coarse sample set, a refined sample set, and/or a final sample set.

As described above, the progressive sampling engine 506 can generate a sample set with a particular number of samples (e.g., a coarse number of data samples or a refined number of data samples). Moreover, the progressive sampling engine 506 can generate a sample set comprising particular attributes (e.g., initial attributes from the initial attribute manager 504 or the focused attributes/final attributes from the attribute selection manager 508). Moreover, as mentioned above, the progressive sampling engine 506 can determine a coarse number of data samples and/or a refined number of data samples.

In addition, the progressive sampling engine 506 can also compare a number of initial samples with an attribute threshold (e.g., the attribute thresholds 412c). For example, prior to iteratively sampling a repository of digital samples, the progressive sampling engine 506 can determine whether the number of initial samples satisfies the attribute threshold. If so, the progressive sampling engine 506 can proceed to generate a coarse sample set.

Moreover, as illustrated in FIG. 5, the progressive sampling attribute selection system 100 also includes the attribute selection manager 508 (e.g., the attribute selection manager 104 and/or the attribute selection algorithm 318). The attribute selection manager 508 can create, generate, select, calculate, determine, rank and/or identify attributes from a sample set. In particular, as discussed above, the attribute selection manager 508 can analyze a sample set and select attributes from the sample set most significant to predicting a target attribute from the sample set. To illustrate, the attribute selection manager 508 can select focused attributes and/or final attributes.

As shown in FIG. 5, the progressive sampling attribute selection system 100 can also include the prediction model facility 510 (e.g., the model builder 102 and/or the model builder 326). The prediction model facility 510 can generate, create, train, and/or utilize a digital predictive model. In particular, the prediction model facility 510 can analyze a sample set and generate a digital predictive model capable of predicting one or more target attributes based on input data samples. Moreover, the prediction model facility 510 can utilize the digital prediction model to predict one or more target attributes.

Moreover, as illustrated in FIG. 5, the progressive sampling attribute selection system 100 also includes the storage manager 512. The storage manager 512 maintains data to perform the functions of the progressive sampling attribute selection system 100. The storage manager 512 can comprise one or more memories or storage devices to maintain data for the progressive sampling attribute selection system 100. As illustrated, the storage manager 512 includes the repository of data samples 512a (e.g., a database of data samples comprising attributes such as the repository of data samples 110, the repository of data samples 200, and/or the repository of data samples 316), sample numbers 512b (e.g., a coarse numbers of data samples, a refined numbers of data samples, or a desired/necessary number of data samples for generating a digital predictive model), attribute thresholds 512c (e.g., a threshold number of attributes for triggering the progressive sampling), and target attributes 512d (e.g., user input of target attributes for predicting a digital model), and sample sets 512e (e.g., coarse sample sets, refined sample sets, or final sample sets).

Each of the components 502-512 of the progressive sampling attribute selection system 100 (as shown in FIG. 5) may be in communication with one another using any suitable communication technologies. It will be recognized that although components 502-512 of the progressive sampling attribute selection system 100 are shown to be separate in FIG. 5, any of components 502-512 may be combined into fewer components, such as into a single facility or module, divided into more components, or configured into different components as may serve a particular embodiment.

The components 502-512 of the progressive sampling attribute selection system 100 can comprise software, hardware, or both. For example, the components 502-512 can comprise one or more instructions stored on a computer-readable storage medium and executable by processors of one or more computing devices. When executed by the one or more processors, the computer-executable instructions of the progressive sampling attribute selection system 100 can cause a client device and/or a server device to perform the methods described herein. Alternatively, the components 502-512 and their corresponding elements can comprise hardware, such as a special purpose processing device to perform a certain function or group of functions. Additionally, the components 502-512 can comprise a combination of computer-executable instructions and hardware.

Furthermore, the components 502-512 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-512 may be implemented as a stand-alone application, such as a desktop or mobile application. Furthermore, the components 502-512 may be implemented as one or more web-based applications hosted on a remote server. The components 502-512 may also be implemented in a suit of mobile device applications or "apps." To illustrate, the components 502-512 may be implemented in an application, including but not limited to ADOBE ANALYTICS software, ADOBE ANALYTICS PREMIUM software, or ADOBE ANALYTICS DATA WORKBENCH software. "ADOBE," "ANALYTICS," "ANALYTICS PREMIUM," and "DATA WORKBENCH" are either registered trademarks or trademarks of Adobe Systems Incorporated in the United States and/or other countries.

Figure 6:
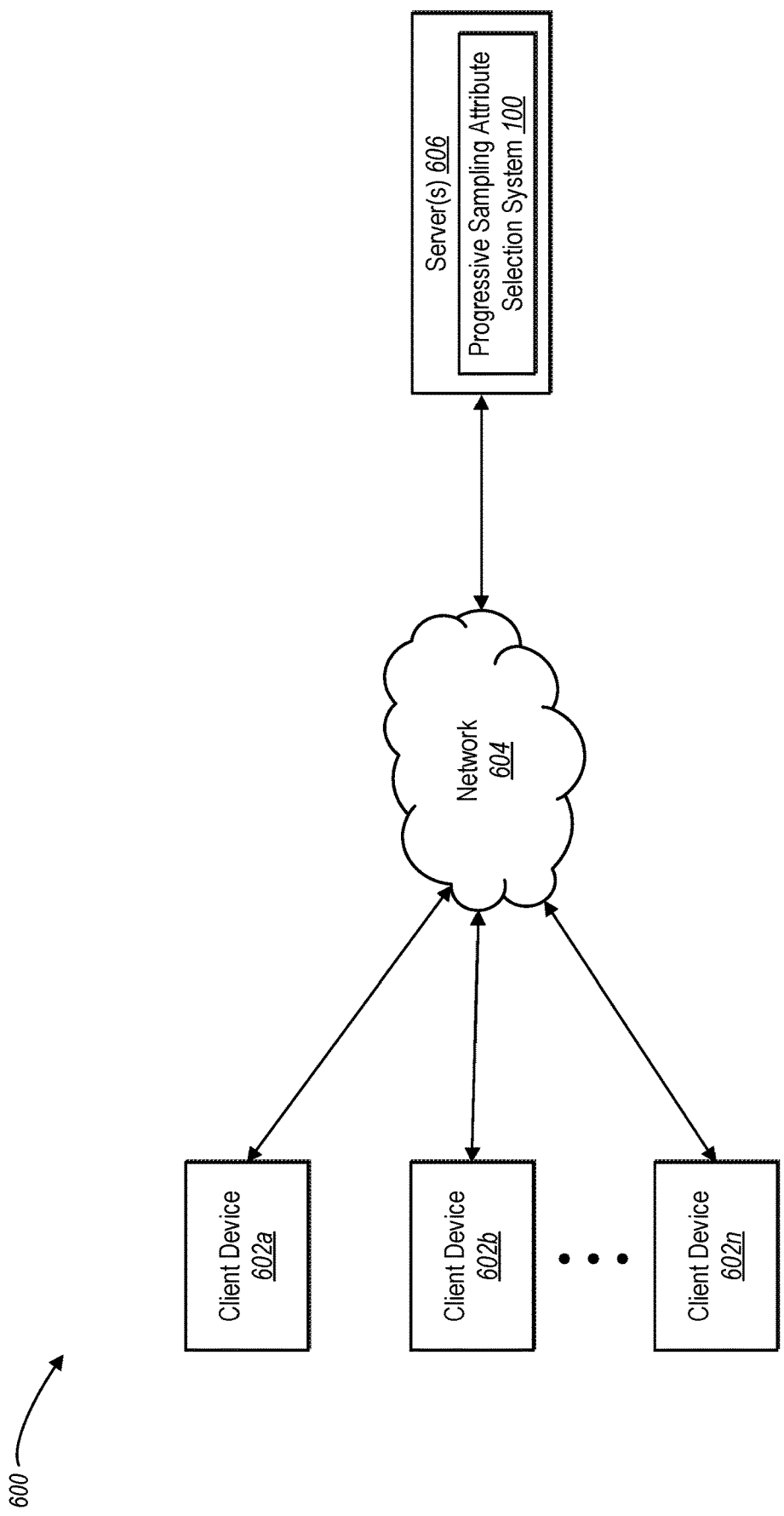
FIG. 6 illustrates a schematic diagram illustrating an exemplary environment in which the progressive sampling attribute selecting system in accordance with one or more embodiments.

FIG. 6 illustrates a schematic diagram of one embodiment of an exemplary environment 600 in which the progressive sampling attribute selection system 100 can operate. In one or more embodiments, the exemplary environment 600 includes one or more client devices 602a, 602b . . . 602n, a network 604, and server(s) 606. The network 604 may be any suitable network over which the computing devices can communicate. Example networks are discussed in more detail below with regard to FIG. 8.

As illustrated in FIG. 6, the environment 600 may include client devices 602a-602n. The client devices 602a-602n may comprise any computing device (e.g., the client device 106). For instance, in one or more embodiments, one or more of the client devices 602a-602n comprise one or more computing devices described below in relation to FIG. 8.

In addition, the environment 600 may also include the server(s) 606 (e.g., the server(s) 108). The server(s) 606 may generate, store, receive, and transmit any type of data, including the repository of data samples 512a, sample numbers 512b, attribute thresholds 512c, target attributes 512d, and sample sets 512e. For example, the server(s) 606 may transmit data to a client device, such as the client device 602a. The server(s) 606 can also transmit electronic messages between one or more users of the environment 600. In one example embodiment, the server(s) 606 comprise a content server. The server(s) 606 can also comprise a communication server or a web-hosting server. Additional details regarding the server(s) 606 will be discussed below with respect to FIG. 8.

As illustrated, in one or more embodiments, the server(s) 606 can include all, or a portion of, the progressive sampling attribute selection system 100. In particular, the progressive sampling attribute selection system 100 can comprise an application running on the server(s) 606 or a portion of a software application that can be downloaded from the server(s) 606. For example, the progressive sampling attribute selection system 100 can include a web hosting application that allows the client devices 602a-602n to interact with content hosted at the server(s) 606. To illustrate, in one or more embodiments of the exemplary environment 600, one or more client devices 602a-602n can access a webpage supported by the server(s) 606. In particular, the client device 602a can run an application to allow a user to access, view, and/or interact with a webpage or web site hosted at the server(s) 606.

Although FIG. 6 illustrates a particular arrangement of the client devices 602a-602n, the network 604, and the server(s) 606, various additional arrangements are possible. For example, while FIG. 6 illustrates multiple separate client devices 602a-602n communicating with the server(s) 606 via the network 604, in one or more embodiments a single client device may communicate directly with the server(s) 606, bypassing the network 604.

Similarly, although the environment 600 of FIG. 6 is depicted as having various components, the environment 600 may have additional or alternative components. For example, the progressive sampling attribute selection system 100 can be implemented on a single computing device. In particular, the progressive sampling attribute selection system 100 may be implemented in whole by the client device 602a or the progressive sampling attribute selection system 100 may be implemented in whole by the server(s) 606. Alternatively, the progressive sampling attribute selection system 100 may be implemented across multiple devices or components (e.g., utilizing the client devices 602a-602n and the server(s) 606).

By way of example, in one or more embodiments, the client device 602a sends a request for a digital predictive model to the server(s) 608. In particular, the client device 602a can send a request for a digital predictive model to predict a target attribute together with an indication of initial attributes for generating the digital predictive model (e.g., via the initial attribute manager 504). The server(s) 608 can utilize the initial attributes to identify a coarse sample set (e.g., via the progressive sampling engine 506). Moreover, the server(s) 608 can provide the coarse sample set to the client device 602a. Upon receiving the coarse sample set, the client device 602a can select focused attributes (e.g., via the attribute selection manager 508) and provide the focused attributes to the server(s) 608. The server(s) 608 can generate a refined sample set based on the focused attributes (e.g., via the progressive sampling engine 506) and provide the refined sample set to the client device 602a. The client device 602a can utilize the refined sample set to identify final attributes (e.g., via the attribute selection manager 508) and generate a digital predictive model (e.g., via the prediction model facility 510). Furthermore, the client device 602a can utilize the digital predictive model to predict one or more target attributes (e.g., via the prediction model facility 510).

In addition, in one or more embodiments, the server(s) 608 generate the repository of data samples (e.g., generate the repository of data samples 512a via the repository manager 502). For example, the server(s) 608 can monitor user interaction with the computing device 602n and generate a data sample corresponding to the user interaction (e.g., a data sample comprising attributes of the user of the computing device 602n). The server(s) 608 can compile the repository of data samples utilizing the data sample from the computing device 602n and other data samples from other computing devices.

Figure 7:
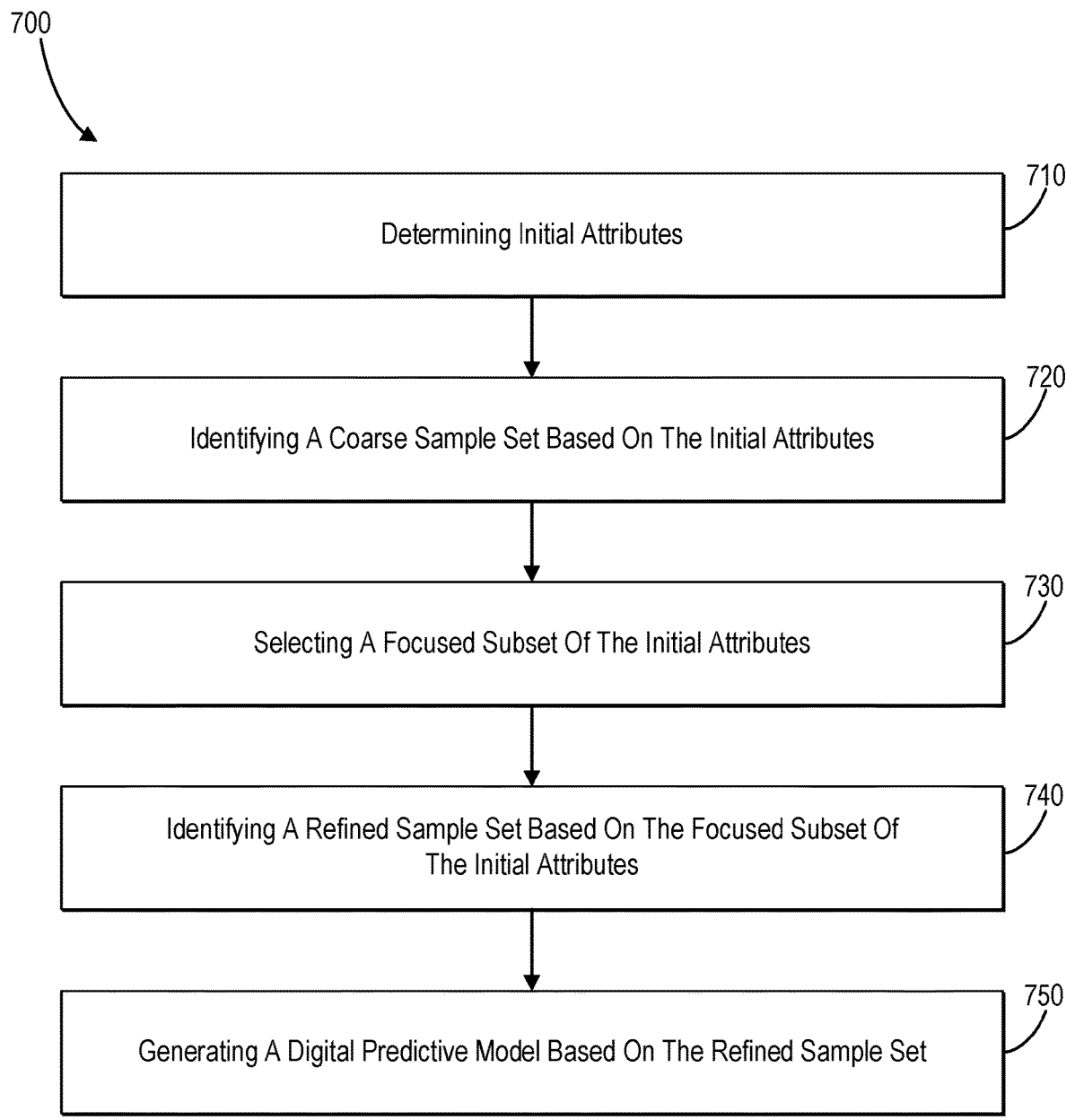
FIG. 7 illustrates a flowchart of a series of acts in a method of utilizing progressive sampling to generate a digital predictive model in accordance with one or more embodiments.

FIGS. 1A-6, the corresponding text, and the examples, provide a number of different systems and devices for progressively sampling data samples to generate a digital predictive model. In addition to the foregoing, embodiments can also be described in terms of flowcharts comprising acts in a method for accomplishing a particular result. For example, FIG. 7 illustrates flowcharts of exemplary methods in accordance with one or more embodiments. The methods described in relation to FIG. 7 may be performed with less or more acts or the acts may be performed in differing orders. Additionally, the acts described herein may be repeated or performed in parallel with one another or in parallel with different instances of the same or similar acts.

FIG. 7 illustrates a flowchart of a series of acts in a method 700 of utilizing progressive sampling to generate a digital predictive model in accordance with one or more embodiments. In one or more embodiments, the method 700 is performed in a digital medium environment that includes the progressive sampling attribute selection system 100. The method 700 is intended to be illustrative of one or more methods in accordance with the present disclosure, and is not intended to limit potential embodiments. Alternative embodiments can include additional, fewer, or different acts than those articulated in FIG. 7.

As illustrated in FIG. 7, the method 700 includes an act 710 of determining initial attributes. In particular, the act 710 can include determining initial attributes for building a digital predictive model to predict a target attribute. The act 710 can include determining initial attributes based on at least one of user input, attributes utilized in a previous digital predictive model, or attributes previously selected by one or more users.

Moreover, as shown in FIG. 7, the method 700 also includes an act 720 of identifying a coarse sample set based on the initial attributes. In particular, the act 720 can include identifying a coarse sample set from a repository of data samples by querying the repository of data samples for a coarse number of data samples, wherein each of the data samples in the coarse sample set comprise the initial attributes. The act 720 can also include determining the coarse number of data samples based on the number of initial attributes. Similarly, the act 720 can include determining the coarse number of data samples based on the refined number of data samples. For instance, in one or more embodiments, the repository of data samples reflects a plurality of samples and a corresponding set of attributes for each sample In addition, as illustrated in FIG. 7, the method 700 also includes an act 730 of selecting a focused subset of the initial attributes. In particular, the act 730 includes selecting a focused subset of the initial attributes based on the coarse sample set. For example, in one or more embodiments, the act 730 includes, for each data sample in the coarse sample set, comparing the initial attributes from the data sample to the target attribute from the data sample; and identifying the focused subset of the initial attributes based on the comparison.

As illustrated in FIG. 7, the method 700 also includes an act 740 of identifying a refined sample set based on the focused subset of the initial attributes. In particular, the act 740 includes identifying a refined sample set from the repository of data samples by querying the repository of data samples for a refined number of data samples, wherein the refined number of data samples is larger than the coarse number of data samples, and wherein each of the data samples in the refined sample set comprises the focused subset of the initial attributes.

Moreover, as shown in FIG. 7, the method 700 also includes an act 750 of generating a digital predictive model based on the refined sample set. In particular, the act 750 can include generating the digital predictive model for predicting the target attribute based on the refined sample set. For example, in one or more embodiments, the act 750 includes selecting final attributes from the focused subset of the initial attributes based on the refined sample set; and generating the digital predictive model based on the final attribute set. Furthermore, the act 750 can also include identifying a final sample set wherein each of the data samples in the final sample set comprises the final attributes; and utilizing the final sample set to generate the digital predictive model. For instance, identifying the final sample set can include filtering the refined sample set utilizing the final attributes to remove one or more attributes from the focused subset of the initial attributes.

Furthermore, in one or more embodiments, the act 750 also includes determining final attributes. For example, the act 750 can include determining final attributes by: identifying a refined sample set from the repository of data samples by querying the repository of data samples for a refined number of data samples, wherein the refined number of data samples is larger than the coarse number of data samples, and wherein each of the data samples in the refined sample set comprise the focused subset of the initial attributes; and selecting the final attributes based on the refined sample set. In one or more embodiments, the number of initial attributes is greater than the number of final attributes. Moreover, in one or more embodiments, the final attributes are more significant in predicting the target attribute than one or more of the initial attributes.

In one or more embodiments, the act 750 further includes determining that the number of initial attributes exceed an attribute threshold. Moreover, the act 750 can include identifying the coarse sample set and selecting the focused subset of the initial attributes based on the determination that the number of initial attributes exceed the attribute threshold.

In addition, in one or more embodiments, the method 700 includes detecting one or more input attributes in relation to a user; and utilizing the digital predictive model to predict the target attribute in relation to the user based on the one or more detected input attributes.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
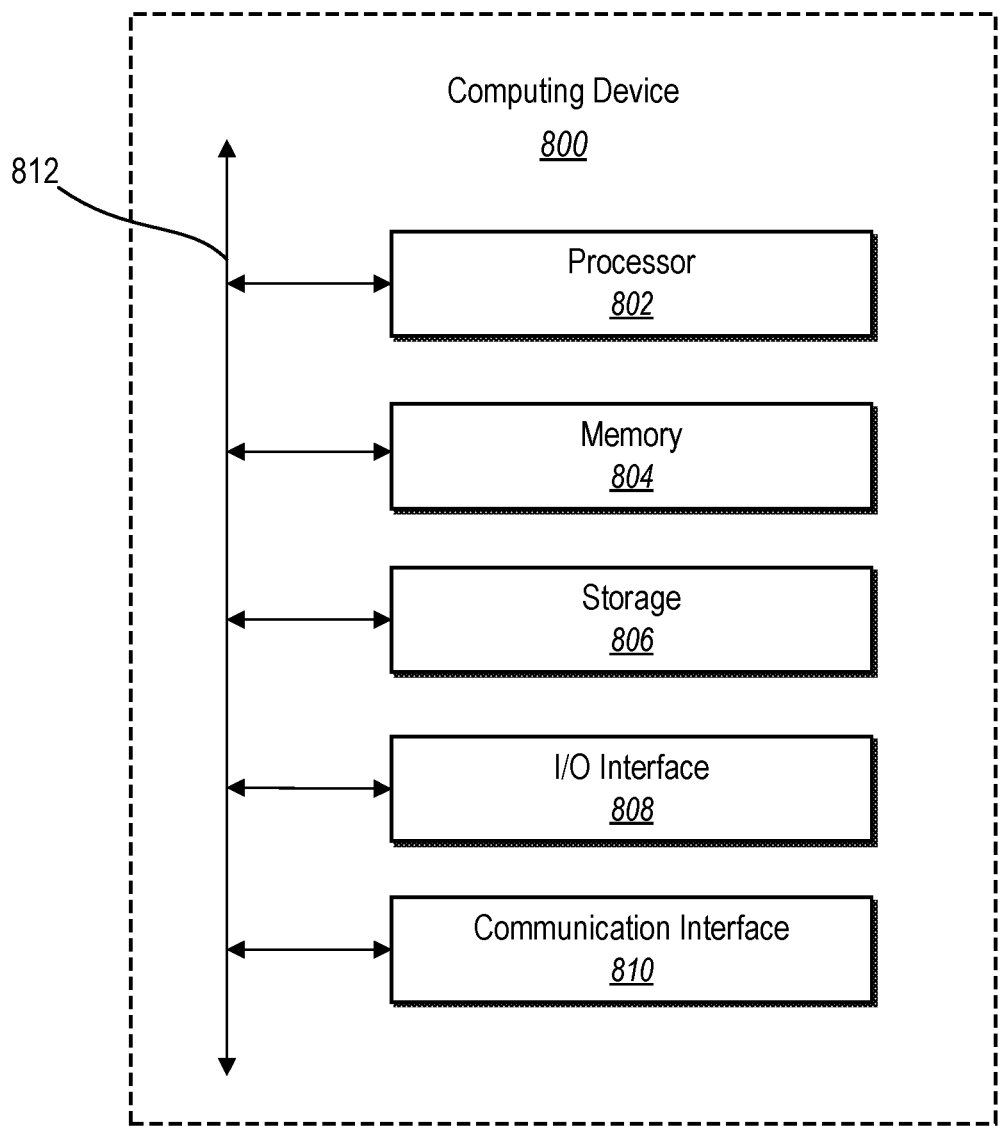
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the progressive sampling attribute selection system 100 can comprise implementations of the computing device 800. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 includes storage for storing data or instructions. As an example and not by way of limitation, storage device 806 can comprise a non-transitory storage medium described above. The storage device 806 may include a hard disk drive (HDD), flash memory, a Universal Serial Bus (USB) drive or a combination of these or other storage devices.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment, a computer-implemented method of selecting attributes for generating digital predictive models, comprising:

identifying a final subset of attributes from an initial set of attributes for use in generating a digital predictive model to predict a target attribute by:

determining the initial set of attributes corresponding to a repository of data samples, the initial set of attributes having an initial number of attributes;

utilizing the initial set of attributes to identify a coarse sample set from the repository of data samples by querying the repository of data samples for a coarse number of data samples, wherein each of the data samples in the coarse sample set comprise the initial set of attributes;

selecting a focused subset of the initial set of attributes based on the coarse sample set by, for each data sample in the coarse sample set, comparing the initial set of attributes from the data sample in the coarse sample set to the target attribute from the data sample in the coarse sample set, wherein the focused subset of the initial set of attributes has a focused number of attributes less than the initial number of attributes;

utilizing the focused subset of the initial set of attributes to identify a refined sample set from the repository of data samples by querying the repository of data samples for a refined number of data samples, wherein the refined number of data samples is larger than the coarse number of data samples, and wherein each of the data samples in the refined sample set comprises the focused subset of the initial set of attributes; and selecting the final subset of attributes from the focused subset of the initial set of attributes by, for each data sample in the refined sample set, comparing the focused subset of the initial set of attributes from the data sample in the refined sample set to the target attribute from the data sample in the refined sample set, wherein the final subset of attributes have a final number of attributes less than the focused number of attributes;

utilizing the final subset of attributes to generate a final sample set by querying the repository of data samples for a final number of data samples, wherein the final number of data samples is larger than the refined number of data samples, and wherein each of the data samples in the final sample set comprises the final subset of attributes; and generating the digital predictive model for predicting the target attribute based on the final sample set comprising the final subset of attributes.

2. The method of claim 1, wherein comparing the initial set of attributes from the data sample in the coarse sample set to the target attribute from the data sample in the coarse sample set comprises applying a feature selection algorithm.

3. The method of claim 1, further comprising:
selecting the coarse number of data samples based on the initial number attributes.

4. The method of claim 1, further comprising selecting the coarse number of data samples based on both the initial number attributes and the final number of data samples.

5. The method of claim 4, wherein selecting the coarse number of data samples based on both the initial number of attributes and the final number of data samples comprises:
determining a ratio between an attribute threshold and the initial number of attributes; and
selecting the coarse number of data samples by applying the final number of data samples to the ratio between the attribute threshold and the initial number of attributes.

6. The method of claim 1, wherein the digital predictive model comprises a machine learning model and generating the digital predictive model comprises training the machine learning model utilizing the final subset of attributes.

7. The method of claim 1, further comprising selecting the coarse number of data samples utilizing a function defined by an inverse power relationship to the initial number of attributes.

8. The method of claim 1, further comprising:
detecting one or more input attributes in relation to a user; and
utilizing the digital predictive model to predict the target attribute in relation to the user based on the one or more detected input attributes.

9. A system for improving digital attribute selection in generating digital predictive models, comprising:
one or more memories comprising a repository of data samples, wherein the repository of data samples reflects a plurality of samples and a corresponding set of attributes for each sample;
at least one computing device storing instructions thereon, that, when executed by at least one computing device, cause the system to:
identify a final subset of attributes from the set of attributes for use in generating a digital predictive model to predict a target attribute by:
determining an initial set of attributes from the set of attributes, the initial set of attributes having an initial number of attributes;
utilizing initial set of attributes to identify a coarse sample set from the repository of data samples by querying the repository of data samples for a coarse number of data samples, wherein each of the data samples in the coarse sample set comprise the initial set of attributes from the set of attributes;
selecting a focused subset of the initial set of attributes based on the coarse sample set by for each data sample in the coarse sample set, comparing the initial set of attributes from the data sample in the coarse sample set to the target attribute from the data sample in the coarse sample set, wherein the focused subset of the initial set of attributes has a focused number of attributes less than the initial number of attributes;
utilizing the focused subset of the initial set of attributes to identify a refined sample set from the repository of data samples by querying the repository of data samples for a refined number of data samples, wherein the refined number of data samples is larger than the coarse number of data samples, and wherein each of the data samples in the refined sample set comprise the focused subset of the initial set of attributes; and
selecting the final subset of attributes from the focused subset of the initial set of attributes by, for each data sample in the refined sample set, comparing the focused subset of the initial set of attributes from the data sample in the refined sample set to the target attribute form the data sample in the refined sample set, wherein the final subset of attributes has a final number of attributes less than the focused number of attributes;
utilize the final subset of attributes to generate a final sample set by querying the repository of data samples for a final number of data samples, wherein the final number of data samples is larger than the refined number of data samples, and wherein each of the data samples in the final sample set comprises the final subset of attributes; and
generate the digital predictive model based on the final sample set comprising the final attributes.

10. The system of claim 9, wherein comparing the initial set of attributes from the data sample in the coarse sample set to the target attribute from the data sample in the coarse sample set comprises applying a feature selection algorithm.

11. The system of claim 9, further comprising instructions that, when executed by the at least one computing device, cause the system to:
select the coarse number of data samples based on the initial number of attributes.

12. The system of claim 11, further comprising instructions that, when executed by the at least one computing device, cause the system to:
determine that the initial number attributes exceed an attribute threshold; and
identify the coarse sample set and select the focused subset of the initial set of attributes based on determining that the initial number of attributes exceed the attribute threshold.

13. The system of claim 9, further comprising instructions that, when executed by the at least one computing device, cause the system to select the coarse number of data samples based on both initial number of attributes and the final number of data samples.

14. A non-transitory computer readable medium storing instructions thereon that, when executed by at least one processor, cause a computer system to:
identify a final subset of attributes from an initial set of attributes for use in generating a digital predictive model to predict a target attribute by:
determining the initial set of attributes corresponding to a repository of data samples, the initial set of attributes having an initial number of attributes;
utilizing the initial set of attributes to identify a coarse sample set from the repository of data samples by querying the repository of data samples for a coarse number of data samples, wherein each of the data samples in the coarse sample set comprise the initial set of attributes;
selecting a focused subset of the initial set of attributes based on the coarse sample set by, for each data sample in the coarse sample set, comparing the initial set of attributes from the data sample in the coarse sample set to the target attribute from the data sample in the coarse sample set, wherein the focused subset of the initial set of attributes has a focused number of attributes less than the initial number of attributes;

utilizing the focused subset of the initial set of attributes to identify a refined sample set from the repository of data samples by querying the repository of data samples for a refined number of data samples, wherein the refined number of data samples is larger than the coarse number of data samples, and wherein each of the data samples in the refined sample set comprises the focused subset of the initial set of attributes; and selecting the final subset of attributes from the focused subset of the initial set of attributes by, for each data sample in the refined sample set, comparing the focused subset of the initial set of attributes from the data sample in the refined sample set to the target attribute from the data sample in the refined sample set, wherein the final subset of attributes has a final number of attributes less than the focused number of attributes;

utilize the final subset of attributes to generate a final sample set by querying the repository of data samples for a final number of data samples, wherein the final number of data samples is larger than the refined number of data samples, and wherein each of the data samples in the final sample set comprises the final subset of attributes; and generate the digital predictive model for predicting the target attribute based on the final sample set comprising the final subset of attributes.

15. The non-transitory computer readable medium of claim 14, wherein the digital predictive model comprises a machine learning model and further comprising instructions that, when executed by the at least one processor, cause the computer system to generate the digital predictive model by training the machine learning model utilizing the final subset of attributes.

16. The non-transitory computer readable medium of claim 15, further comprising instructions that, when executed by the at least one processor, cause the computer system to:
detect one or more input attributes in relation to a user; and
utilize the machine learning model to predict the target attribute in relation to the user based on the one or more detected input attributes.

17. The non-transitory computer readable medium of claim 14, further comprising instructions that, when executed by the at least one processor, cause the computer system to select the coarse number of data samples utilizing a function defined by an inverse power relationship to the initial number attributes.

18. The non-transitory computer readable medium of claim 14, further comprising instructions that, when executed by the at least one processor, cause the computer system to select the coarse number of data samples based on both the initial number attributes and the final number of data samples.

19. The non-transitory computer readable medium of claim 14, further comprising instructions that, when executed by the at least one processor, cause the computer system to select the coarse number of data samples by:
determining a ratio between an attribute threshold and the initial number of attributes; and
selecting the coarse number of data samples by applying the final number of data samples to the ratio between the attribute threshold and the initial number attributes.

20. The non-transitory computer readable medium of claim 14, further comprising instructions that, when executed by the at least one processor, cause the computer system to compare the initial set of attributes from the data sample in the coarse sample set to the target attribute from the data sample in the coarse sample set by applying a feature selection algorithm.

* * * * *